(12) United States Patent
Mori et al.

(10) Patent No.: US 11,681,406 B2
(45) Date of Patent: Jun. 20, 2023

(54) TOUCH PANEL DEVICE, DEPRESSING FORCE CALCULATION METHOD, AND STORAGE MEDIUM STORING DEPRESSING FORCE CALCULATION PROGRAM

(71) Applicant: Mitsubishi Electric Corporation, Tokyo (JP)

(72) Inventors: Kentaro Mori, Tokyo (JP); Yuichi Sasaki, Tokyo (JP); Akihito Yamamoto, Tokyo (JP); Sohei Osawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/668,677

(22) Filed: Feb. 10, 2022

(65) Prior Publication Data

US 2022/0164069 A1 May 26, 2022

Related U.S. Application Data

(63) Continuation of application No. PCT/JP2019/034696, filed on Sep. 4, 2019.

(51) Int. Cl.
*G06F 3/044* (2006.01)
*G06F 3/041* (2006.01)
*G02F 1/1333* (2006.01)

(52) U.S. Cl.
CPC .......... *G06F 3/0447* (2019.05); *G06F 3/0416* (2013.01); *G02F 1/13338* (2013.01)

(58) Field of Classification Search
None
See application file for complete search history.

(56) References Cited

U.S. PATENT DOCUMENTS

| | | | |
|---|---|---|---|
| 2003/0214485 | A1 | 11/2003 | Roberts |
| 2010/0229091 | A1 | 9/2010 | Homma et al. |
| | | (Continued) | |

FOREIGN PATENT DOCUMENTS

| | | | |
|---|---|---|---|
| JP | 2005-526333 | A | 9/2005 |
| JP | 2010-244252 | A | 10/2010 |
| | (Continued) | | |

*Primary Examiner* — Stephen T. Reed
(74) *Attorney, Agent, or Firm* — Birch, Stewart, Kolasch & Birch, LLP

(57) ABSTRACT

A touch panel device includes: a touch panel; an elastic member that supports the touch panel; a plurality of depressing force sensors arranged at installation positions where depression or upward warps of the touch panel occur due to the application of depressing force; and processing circuitry to obtain touch coordinates; to obtain a plurality of detection values corresponding to the sensor signals; and to load a plurality of predetermined depressing force calculation modes from a storage storing a plurality of regions on the operation surface and the plurality of predetermined depressing force calculation modes corresponding to the plurality of regions, to select a depressing force calculation mode for a region corresponding to the touch coordinates from the plurality of depressing force calculation modes, and to calculate the depressing force by using the selected depressing force calculation mode and the plurality of detection values.

5 Claims, 29 Drawing Sheets

FIRST EMBODIMENT

(56) References Cited

U.S. PATENT DOCUMENTS

| | | | |
|---|---|---|---|
| 2011/0141052 A1* | 6/2011 | Bernstein | G06F 3/041 |
| | | | 341/5 |
| 2012/0075226 A1 | 3/2012 | Andoh | |
| 2014/0062956 A1 | 3/2014 | Ishizone et al. | |
| 2018/0164923 A1* | 6/2018 | Hirabayashi | G06F 3/0446 |

FOREIGN PATENT DOCUMENTS

| | | |
|---|---|---|
| JP | 2016-6683 A | 1/2016 |
| JP | 2018-97632 A | 6/2018 |
| WO | WO 2012/153555 A1 | 11/2012 |

\* cited by examiner

FIRST EMBODIMENT

SECOND EMBODIMENT

SECOND EMBODIMENT

THIRD EMBODIMENT

THIRD EMBODIMENT

FOURTH EMBODIMENT

MODIFICATION OF FOURTH EMBODIMENT

FIFTH EMBODIMENT

FIFTH EMBODIMENT

SIXTH EMBODIMENT

SIXTH EMBODIMENT

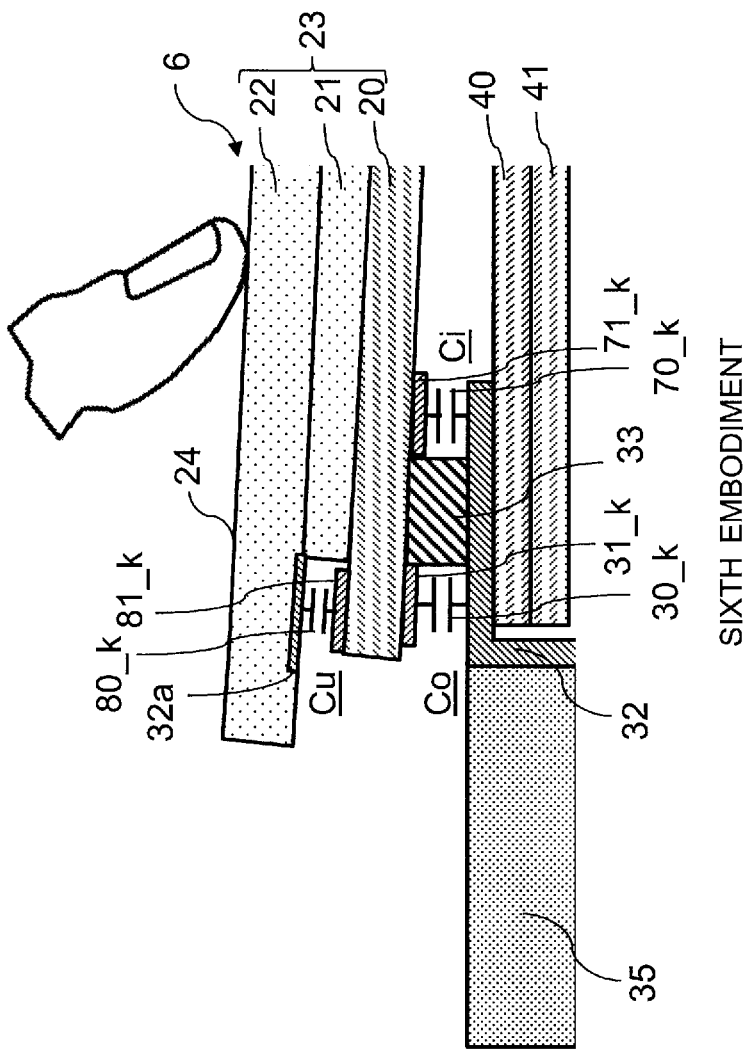

TOUCH PANEL DEVICE, DEPRESSING FORCE CALCULATION METHOD, AND STORAGE MEDIUM STORING DEPRESSING FORCE CALCULATION PROGRAM

CROSS-REFERENCE TO RELATED APPLICATION

This application is a continuation application of International Application No. PCT/JP2019/034696 having an international filing date of Sep. 4, 2019.

BACKGROUND OF THE INVENTION

1. Field of the Invention

The present disclosure relates to a touch panel device, a depressing force calculation method and a depressing force calculation program.

2. Description of the Related Art

There has been proposed a touch panel device capable of detecting touch coordinates indicating the position of a touch operation performed on an operation surface of a touch panel and depressing force applied to the operation surface by the touch operation. See Japanese Patent Application Publication No. 2016-006683 (paragraph 0057) as Patent Reference 1, for example. This touch panel device has previously stored data indicating a correspondence relationship among the touch coordinates, the depressing force and a plurality of voltages (referred to also as a "voltage pattern") occurring to a plurality of electrodes in a detection unit. This touch panel device obtains the depressing force by using the previously stored data when a touch operation is performed on the operation surface of the touch panel.

However, there is a limitation on the number of pieces of data previously stored, and thus the above-described touch panel device is incapable of detecting the depressing force applied to the operation surface by the touch operation with high accuracy.

SUMMARY OF THE INVENTION

An object of the present disclosure, which has been made to resolve the above-described problem, is to provide a touch panel device, a depressing force calculation method and a depressing force calculation program that make it possible to detect the depressing force of the touch operation with high accuracy.

A touch panel device of the present disclosure includes a touch panel having an operation surface on which a touch operation is performed; an elastic member that supports the touch panel; a plurality of depressing force sensors arranged at installation positions outside the elastic member and outputting sensor signals corresponding to magnitude of depressing force and a position on the operation surface to which the depressing force is applied, wherein the installation positions are positions where depression of the touch panel occurs due to the application of the depressing force or where upward warps of the touch panel occur due to the application of the depressing force, depending on the magnitude of the depressing force and the position on the operation surface to which the depressing force is applied; and processing circuitry to obtain touch coordinates indicating a position of the touch operation; to obtain a plurality of detection values corresponding to the sensor signals when the depressing force is applied to the operation surface; and to load a plurality of predetermined depressing force calculation modes from a storage storing a plurality of regions on the operation surface and the plurality of predetermined depressing force calculation modes corresponding to the plurality of regions, to select a depressing force calculation mode for a region corresponding to the touch coordinates from the plurality of depressing force calculation modes, and to calculate the depressing force by using the selected depressing force calculation mode and the plurality of detection values.

According to the present disclosure, the depressing force of the touch operation can be detected with high accuracy.

BRIEF DESCRIPTION OF THE DRAWINGS

In the attached drawings,

FIG. 31 is a schematic cross-sectional view showing a state when depressing force is applied to the operation surface of the touch panel device of FIG. 30.

DETAILED DESCRIPTION OF THE INVENTION

Touch panel devices, depressing force calculation methods and depressing force calculation programs according to embodiments of the present disclosure will be described below with reference to the drawings. The following embodiments are just examples and a variety of modifications are possible within the scope of the present disclosure.

(1) First Embodiment (1-1) Configuration

Figure 1:
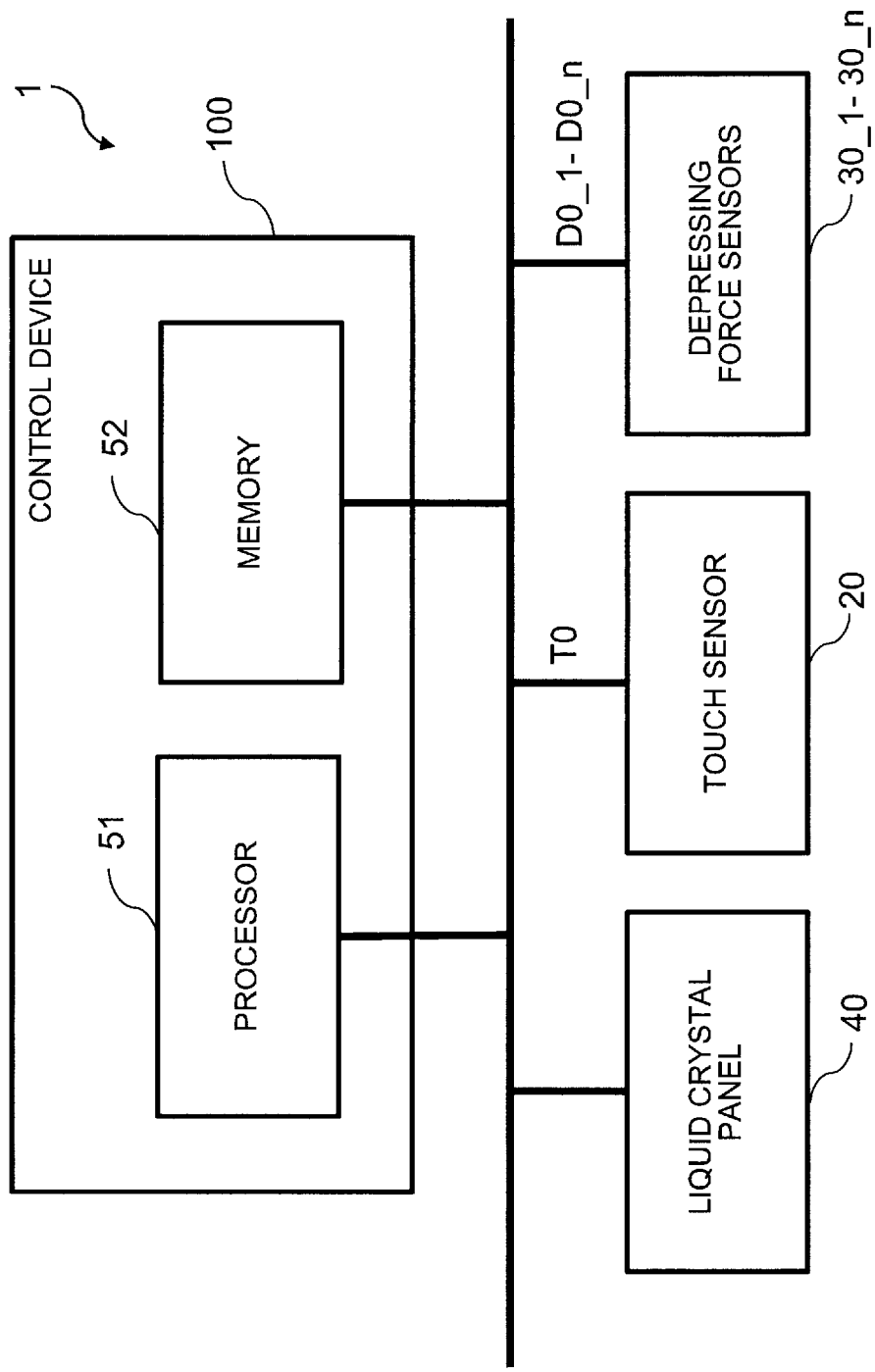
FIG. 1 is a diagram showing an example of the hardware configuration of a touch panel device according to a first embodiment of the present disclosure.

FIG. 1 is a diagram showing an example of the hardware configuration of a touch panel device 1 according to a first embodiment. The touch panel device 1 is capable of detecting touch coordinates indicating the position of a touch operation performed on an operation surface of a touch panel and depressing force applied to the operation surface by the touch operation. The touch panel device 1 judges the contents of the touch operation based on the obtained touch coordinates and the detected depressing force.

As shown in FIG. 1, the touch panel device 1 includes a touch sensor 20, a plurality of depressing force sensors 30_1-30_$n$, a liquid crystal panel 40 as a display, and a control device 100. The character n represents a positive integer. Incidentally, except for the positions and the number of the depressing force sensors 30_1-30_$n$, hardware configurations of touch panel devices according to second to sixth embodiments which will be described later are also the same as the hardware configuration shown in FIG. 1.

On a front surface of the touch sensor 20, a protective glass (22 in FIG. 3A described later) has been stuck by using an adhesive agent (21 in FIG. 3A described later). The touch sensor 20, the adhesive agent 21 and the protective glass 22 constitute a touch panel (23 in FIG. 3A described later). The touch panel 23 has the operation surface (24 in FIG. 3A described later) on which touch operations are performed by a user. The operation surface 24 is a front surface of the protective glass 22.

The liquid crystal panel 40 is a liquid crystal display arranged in superimposition with the touch sensor 20. The liquid crystal panel 40 is controlled by the control device 100 and displays images such as an operation screen. The operation screen is a user interface (UI) screen including objects as operation components such as icons.

The touch sensor 20 is, for example, a touch sensor of the capacitive type in which the capacitance of a part of the operation surface 24 in contact with a conductor changes. The touch sensor 20 outputs touch information T0, as position information corresponding to the touch operation, to the control device 100. The conductor is a finger of the user, an operation assistance tool such as a stylus pen held by the user's hand, or the like. However, the touch sensor 20 can also be a touch sensor of a type other than the capacitive type.

When depressing force is applied by the user to the operation surface 24 of the touch panel 23, the depressing force sensors 30_1-30_$n$ output sensor signals D0_1-D0_$n$ as electric signals corresponding to the depressing force applied to the operation surface 24 of the touch panel 23 to the control device 100. Any one of the depressing force sensors is also represented by "depressing force sensor 30_$j$ or 30_$k$". Further, any one of the sensor signals is also represented by "sensor signal D0_$j$ or D0_$k$". The character j or k represents an integer greater than or equal to 1 and less than or equal to n.

The control device 100 includes a processor 51 as an information processing unit and a memory 52 as a storage unit for storing information. The control device 100 is a computer, for example. A program has been installed in the memory 52. The program is installed via a network or from a non-transitory computer-readable storage medium (i.e., tangible recording medium) storing information such as a program, for example. The program may include a depressing force calculation program for executing a depressing force calculation method which will be described later. The processor 51 controls the operation of the whole of the touch panel device 1 by executing the program stored in the memory 52. The whole or part of the control device 100 may be formed with processing circuitry such as a control circuit made of semiconductor integrated circuits. The memory 52 can include various types of storages such as a semiconductor storage device, a hard disk drive and a device that records information in a removable record medium.

The control unit 100 executes a process corresponding to the touch operation performed on the operation surface 24 of the touch panel 23. The control device 100 is capable of distinguishing between a touch operation of touching the operation surface 24 of the touch panel 23 with depressing force less than a predetermined threshold value and a touch operation of touching the operation surface 24 of the touch panel 23 with depressing force greater than or equal to the threshold value (referred to also as a "depressing touch operation" or a "depressing operation"). Specifically, the control device 100 executes a process based on the touch information T0 that is based on the capacitance change in the touch sensor 20 corresponding to the touch operation performed on the operation surface 24 of the touch panel 23 and the sensor signals D0_1-D0_$n$ outputted from the depressing force sensors 30_1-30_$n$ corresponding to the depressing force applied to the operation surface 24. For example, the control device 100 transmits a control signal corresponding to the touch operation performed on the operation surface 24 of the touch panel 23 to a different apparatus connected to the touch panel device 1 or a different apparatus capable of communicating with the touch panel device 1. The different apparatus is a control target device, such as a production facility, a vehicle or a household electrical appliance, for example.

Figure 2:
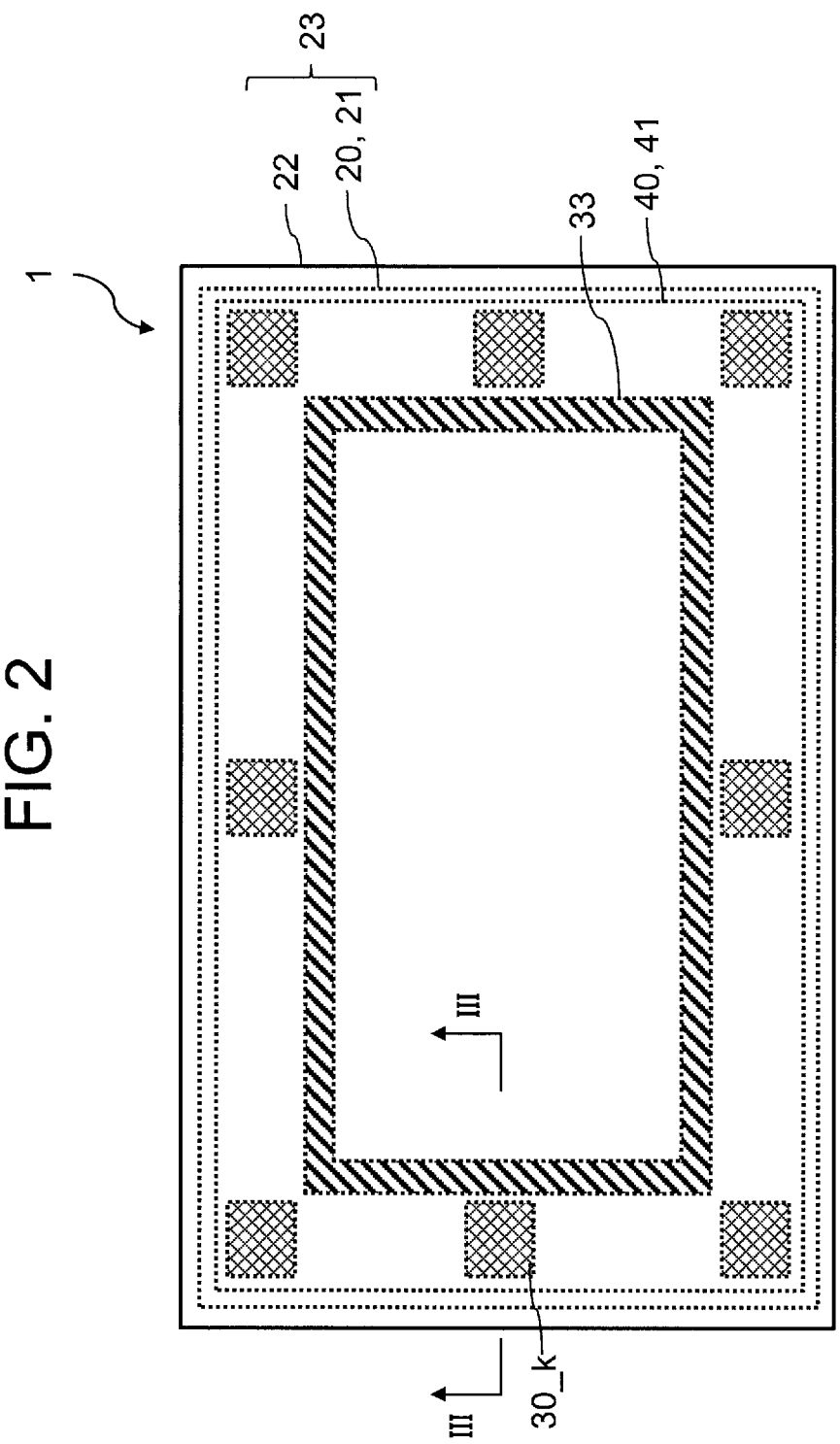
FIG. 2 is a schematic plan view showing the touch panel device in the first embodiment.

FIG. 2 is a schematic plan view showing the touch panel device 1 according to the first embodiment. FIGS. 3A and 3B are schematic cross-sectional views of the touch panel device 1 according to the first embodiment taken along the line in FIG. 2. FIG. 3A shows a state in which no touch operation is being performed, while FIG. 3B shows a state in which depressing force is applied to the operation surface 24 by a touch operation.

As shown in the drawings, the touch panel device 1 includes a substrate 41 that is formed integrally with the liquid crystal panel 40, an elastic member 33 that supports the touch panel 23 to be in superimposition with the liquid crystal panel 40, and the depressing force sensors 30_$j$ ($j$=1, 2, . . . , n). The depressing force sensor 30_$j$ includes a sensor electrode part 31_$j$ as a first electrode arranged on the touch sensor 20 (i.e., on the touch panel 23's side) and a GND electrode part 32 arranged on the liquid crystal panel 40's side (i.e., a housing's side of the touch panel device 1) to face the sensor electrode part 31_$j$ and connected to a frame GND (i.e., ground potential). In FIG. 2, the sensor electrode parts 31_$j$ are provided on four corner parts of the touch sensor 20 and centers of four sides of the touch sensor 20. However, the positions, the number and shapes of the sensor electrode parts 31_1-31_$n$ are not limited to those in the example of FIG. 2.

The elastic member 33 supports the touch panel 23. The elastic member 33 may be formed with a plurality of parts separated from each other. The substrate 41 is fixed to the housing of the touch panel device 1. Further, the plan-view shape of the touch panel 23 can be a shape other than a quadrangle.

Figure 3:
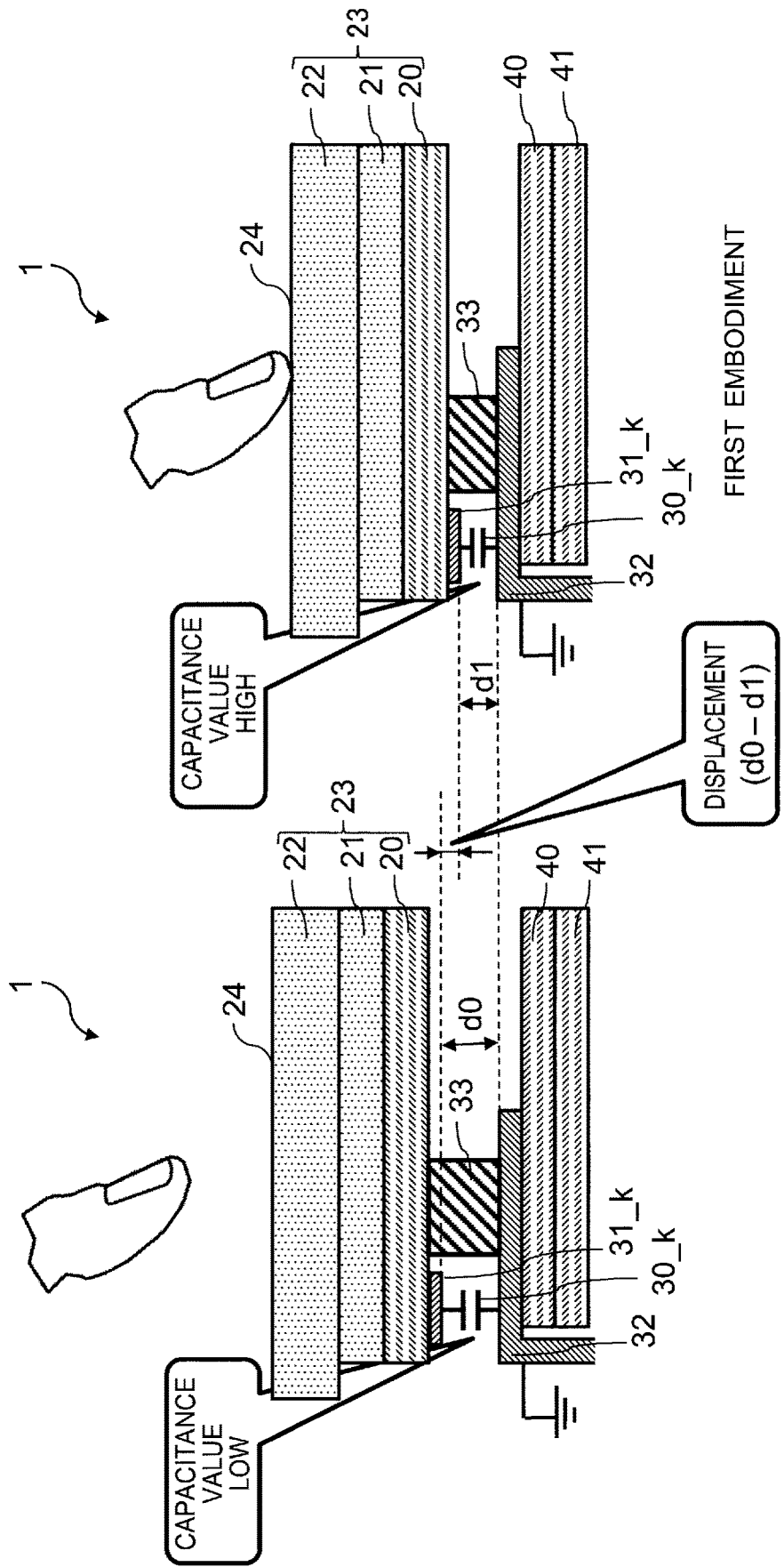
FIGS. 3A and 3B are schematic cross-sectional views of the touch panel device according to the first embodiment taken along the line III-III in FIG. 2.

When a conductor is in contact with the operation surface 24 of the touch panel 23 as shown in FIG. 3B, the capacitance of the part of the touch sensor 20 in contact with the conductor changes. The control device 100 detects the capacitance at each position in the touch sensor 20 and thereby obtains the position of the part in contact with the conductor, i.e., the touch coordinates indicating two-dimensional coordinates on the touch sensor 20. The control device 100 calculates the touch coordinates as position coordinates indicating the position of the conductor contact part on the operation surface 24 based on the capacitance at each position on the operation surface 24 of the touch panel 23, i.e., at each position in the touch sensor 20. The conductor contact part is, for example, a part in which the capacitance is higher than predetermined reference capacitance. The touch coordinates indicating the position of the conductor contact part are referred to also as "capacitance coordinates".

Further, when depressing force is applied to the operation surface 24 of the touch panel 23 as shown in FIG. 3B, the elastic member 33 is compressed and the depressing force applied to the operation surface 24 is detected by the depressing force sensors 30_1-30_$n$. The depressing force sensors 30_1-30_$n$ detect the capacitance changed by the depressing force and output the sensor signals D0_1-D0_$n$ based on the capacitance. When the elastic member 33 is elastically deformed and becomes thinner due to the depressing as shown in FIG. 3B, the capacitance Co detected by the sensor electrode part 31_$j$ of the depressing force sensor 30_$j$ increases. Further, when the elastic member 33 is restored to the original state to be thick by stopping the application of the depressing force as shown in FIG. 3A, the capacitance Co detected by the sensor electrode part 31_$j$ of the depressing force sensor 30_$j$ decreases and returns to the initial value. As shown in FIGS. 3A and 3B, the depressing force sensor 30_$j$ outputs the sensor signal D0_$j$ indicating a value corresponding to the difference between an inter-electrode distance d0 in the initial state and an inter-electrode distance d1 when the elastic member 33 is compressed, i.e., a displacement (d0-d1). The inter-electrode distance is the distance between the sensor electrode part 31_$j$ and the GND electrode part 32.

The depressing force sensors 30_1-30_$n$ output the sensor signals D0_1-D0_$n$ corresponding to the depressing force applied to the operation surface 24 and a pressing position to which the depressing force is applied. The control device 100 calculates the depressing force by using the sensor signals D0_1-D0_$n$ outputted from the depressing force sensors 30_1-30_$n$, the touch information T0 outputted from the touch sensor 20, and a piece of information included in information indicating a plurality of depressing force calculation modes previously stored for calculating the depressing force. Incidentally, the "depressing force calculation mode" is also referred to simply as a "calculation mode". Further, the control device 100 is capable of calculating the position coordinates indicating the pressing position on the operation surface 24 of the touch panel 23 based on the sensor signals D0_1-D0_$n$.

The depressing force sensors 30_1-30_$n$ are not limited to sensors of the capacitive type. The depressing force sensors 30_1-30_$n$ can also be strain sensors that sense minute strain of the touch panel 23 when depressing force is applied to the operation surface 24 of the touch panel 23, piezoelectric sensors that generate voltage signals corresponding to the depressing force, or the like.

Figure 4:
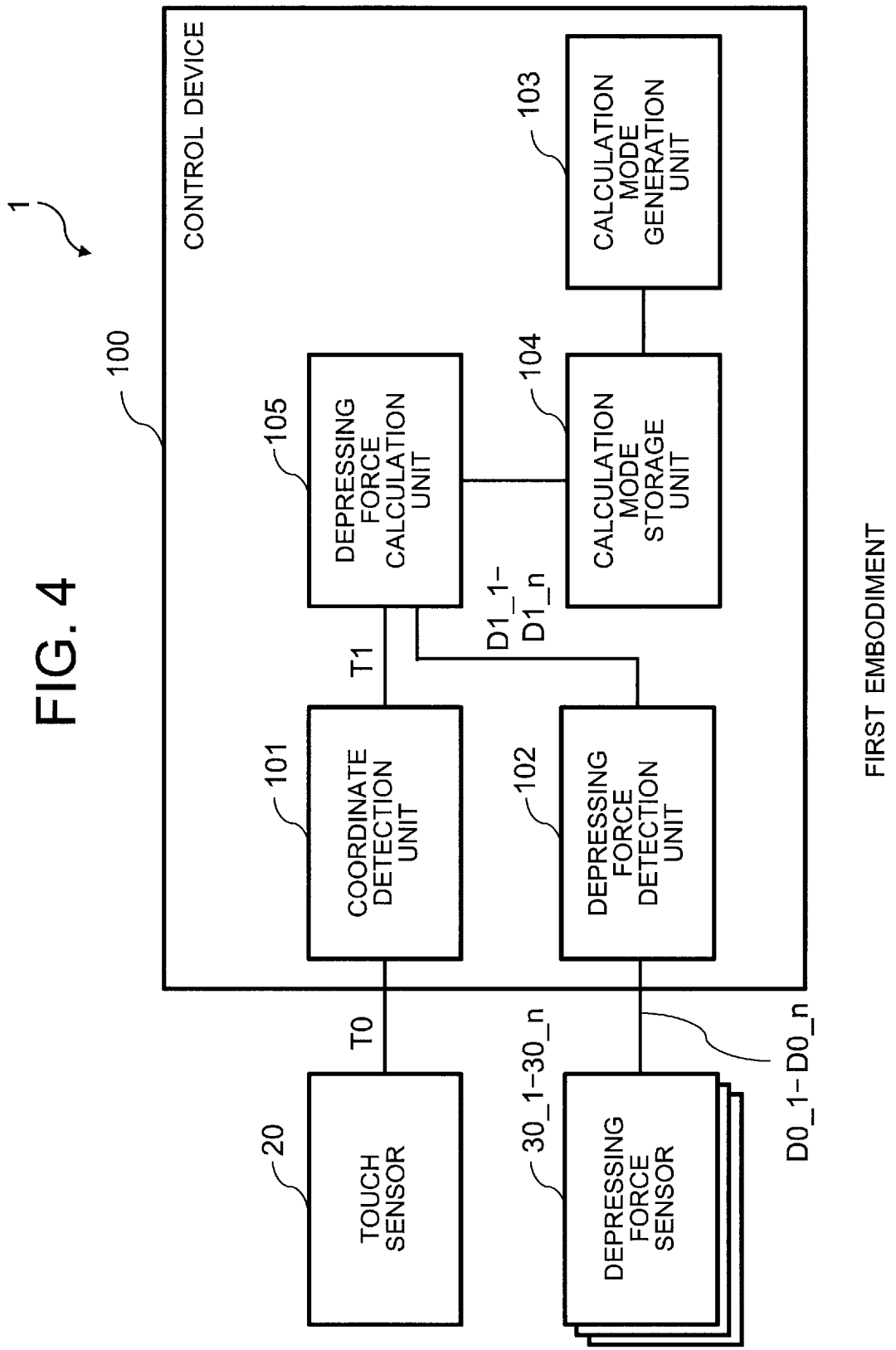
FIG. 4 is a functional block diagram schematically showing the configuration of the touch panel device according to the first embodiment.

FIG. 4 is a functional block diagram schematically showing the configuration of the touch panel device 1 according to the first embodiment. In FIG. 4, each component identical or corresponding to a component shown in FIG. 1 is assigned the same reference character as in FIG. 1. As shown in FIG. 4, the control device 100 includes a coordinate detection unit 101, a depressing force detection unit 102, a calculation mode generation unit 103 that generates a depressing force calculation mode for each of a plurality of regions of the touch panel 23, a calculation mode storage unit 104 that stores the information indicating the plurality of depressing force calculation modes (hereinafter referred to as "calculation mode information"), and a depressing force calculation unit 105 that loads the plurality of depressing force calculation modes from the calculation mode storage unit 104 and calculates the depressing force by using one of the plurality of pieces of calculation mode information. However, the calculation mode storage unit 104 does not necessarily have to be a part of the touch panel device 1. The calculation mode storage unit 104 can also be an external storage device connected to the touch panel device 1 to be capable of communication with the touch panel device 1.

Specifically, the control device 100 includes the coordinate detection unit 101 that obtains touch coordinates T1 indicating the position of the touch operation on the operation surface 24 of the touch panel 23, the depressing force detection unit 102 that obtains a plurality of detection values D1_1-D1_n corresponding to the sensor signals when depressing force is applied to the operation surface 24, the calculation mode storage unit 104 that stores a plurality of regions on the operation surface 24 and a plurality of predetermined depressing force calculation modes corresponding to the plurality of regions, and the depressing force calculation unit 105 that selects a depressing force calculation mode for the region corresponding to the touch coordinates T1 from the plurality of depressing force calculation modes and calculates the depressing force by using the selected depressing force calculation mode and the plurality of detection values D1_1-D1_n.

The coordinate detection unit 101 generates the touch coordinates T1 that are coordinate information based on the touch information T0 being a signal outputted from the touch sensor 20 due to the touch operation. Specifically, the coordinate detection unit 101 detects the presence or absence of contact of a conductor with the operation surface 24 of the touch panel 23 by detecting the capacitance at each position in the touch sensor 20. The coordinate detection unit 101 calculates the touch coordinates T1 indicating the coordinates of the conductor contact part as a region in which the detection value of the capacitance is higher than a predetermined threshold capacitance. The coordinate detection unit 101 supplies the touch coordinates T1 to components such as the depressing force calculation unit 105.

The depressing force detection unit 102 outputs detection values D1 based on the depressing force applied to the operation surface 24 of the touch panel 23 by the touch operation. Specifically, the depressing force detection unit 102 receives the sensor signals D0_1-D0_n outputted from the depressing force sensors 30_1-30_n and outputs the detection values D1_1-D1n based on the sensor signals D0_1-D0_n.

The calculation mode generation unit 103 generates a plurality of pieces of calculation mode information indicating a plurality of depressing force calculation modes by means of a simulation based on characteristics of bending of the touch panel 23 and depression of the elastic member 33. An example of the depressing force calculation mode will be described later as an expression (1). Each of the plurality of pieces of calculation mode information is, for example, a set of values of coefficients $K_1$-$K_n$ in the expression (1). Further, the calculation mode generation unit 103 determines a plurality of regions corresponding to the plurality of depressing force calculation modes. The plurality of regions are regions obtained by dividing the touch sensor 20. Each of the plurality of regions is stored in the calculation mode storage unit 104 while being associated with a depressing force calculation mode capable of calculating the depressing force satisfying predetermined target accuracy in the region. In short, the calculation mode generation unit 103 stores the plurality of regions of the touch sensor 20 and the depressing force calculation modes respectively corresponding to the plurality of regions in the calculation mode storage unit 104.

The depressing force calculation unit 105 selects the depressing force calculation mode for the region corresponding to the touch coordinates T1 from the depressing force calculation modes stored in the calculation mode storage unit 104 based on the touch coordinates T1 obtained by the coordinate detection unit 101 and loads the selected depressing force calculation mode. The depressing force calculation unit 105 calculates the depressing force based on the plurality of detection values D1_1-D1_n detected by the depressing force detection unit 102 and the selected depressing force calculation mode.

Figure 5:
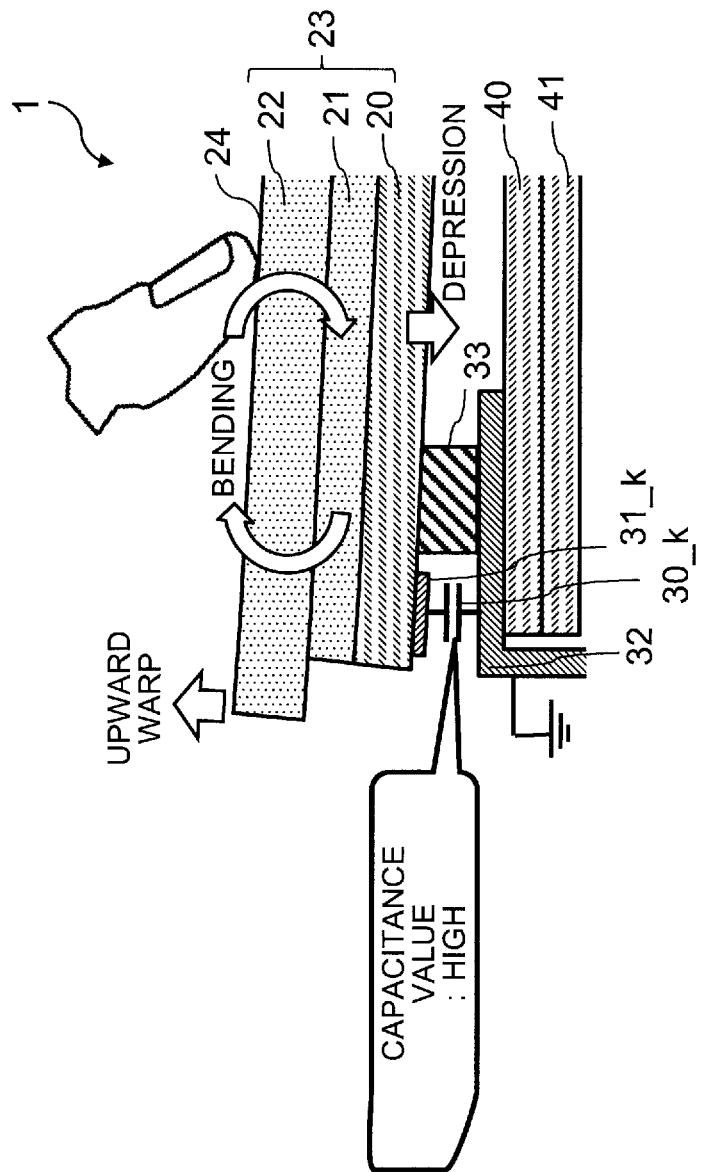
FIG. 5 is a schematic cross-sectional view showing conditions of a touch panel, an elastic member and a depressing force sensor when depressing force is applied to an operation surface of the touch panel in the first embodiment.

FIG. 5 is a schematic cross-sectional view showing conditions of the touch panel 23, the elastic member 33 and the depressing force sensor 30_j when depressing force is applied to the operation surface 24 of the touch panel 23 in the first embodiment. The GND electrode part 32 is attached to the liquid crystal panel 40. An upper surface of the elastic member 33 arranged on the inside of the depressing force sensor 30_j is bonded to the touch sensor 20, and a lower surface of the elastic member 33 is bonded to the GND electrode part 32. The elastic member 33 has elasticity, and when the elastic member 33 is compressed and depressed by depressing the protective glass 22, the distance between the sensor electrode part 31_j and the GND electrode part 32 of the depressing force sensor 30_j decreases and the capacitance Co of the depressing force sensor 30_j increases. Further, depressing the protective glass 22 causes the bending of the touch panel 23 formed with the protective glass 22, the adhesive agent 21 and the touch sensor 20, and occurrence of an upward warp of parts of the touch panel 23 in the vicinity of edge parts leads to a slight increase in the distance between the sensor electrode part 31_j and the GND electrode part 32. Thus, when the upward warp has occurred, the capacitance Co of the depressing force sensor 30_j decreases slightly compared to a case where no upward warp occurs. Furthermore, since the level of the upward warp varies depending on the position where the depressing force is applied, the magnitude of the influence of the upward warp on the capacitance Co also varies depending on the position where the depressing force is applied.

Figure 6:
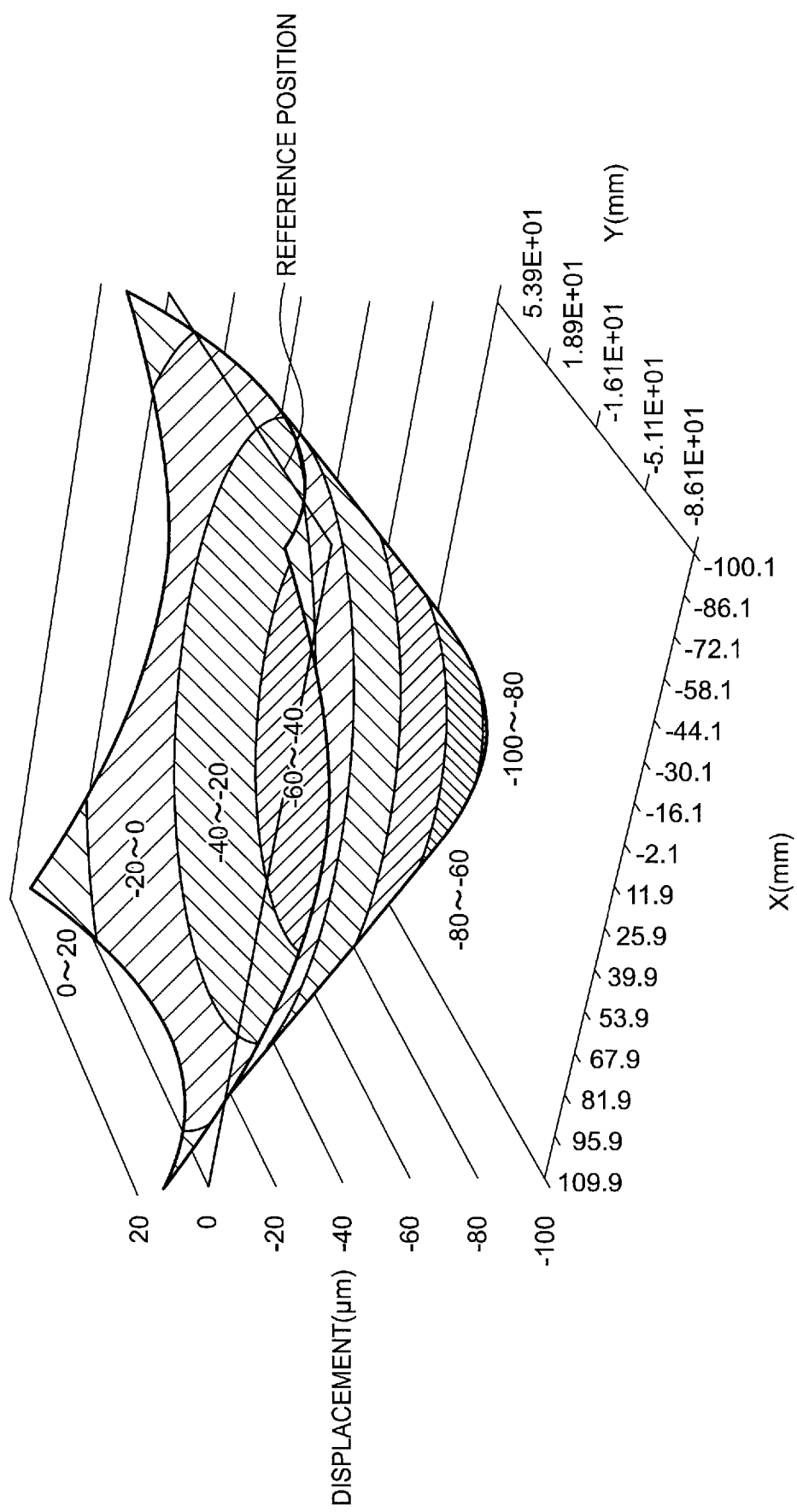
FIG. 6 is a diagram showing a result of a simulation of the shape of a protective glass when depressing force is applied to a central part of the protective glass of the touch panel.

FIG. 6 is a diagram showing a result of a simulation of the shape of the protective glass 22 when depressing force is applied to a central part of the protective glass 22 of the touch panel 23. FIG. 6 shows an example of the bending of the touch panel 23 and depression of the touch panel 23 due to the compression of the elastic member 33 supporting the touch panel 23 when depressing force of 1 [N] is applied to a central part of the operation surface 24 of the touch panel 23. When depressing force is applied to the central part of the operation surface 24 of the touch panel 23, four corners of the touch panel 23 warp upward as shown in FIG. 6. Namely, positions of the four corners of the touch panel 23 in a vertical axis direction have shifted upward relative to "0" as a reference position. Incidentally, the vertical axis direction is a direction orthogonal to both of an X direction and a Y direction each being parallel to a side of the touch panel 23.

Figure 7:
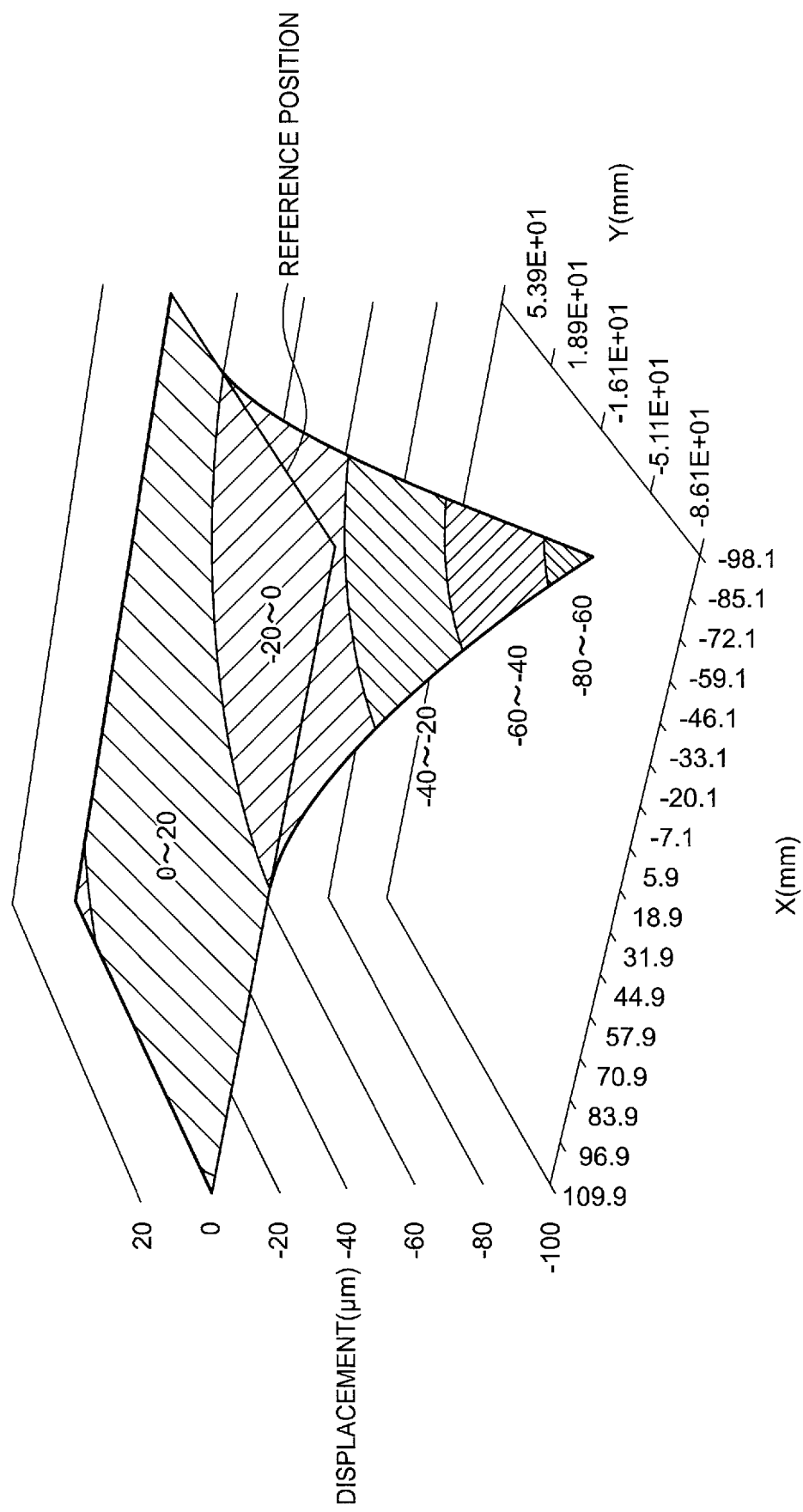
FIG. 7 is a diagram showing a result of a simulation of the shape of the protective glass when depressing force is applied to one corner part of the protective glass of the touch panel.

FIG. 7 is a diagram showing a result of a simulation of the shape of the protective glass 22 when depressing force is applied to a corner part of the protective glass 22 of the touch panel 23. FIG. 7 shows an example of the bending of the touch panel 23 and the depression of the touch panel 23 due to the compression of the elastic member 33 supporting the touch panel 23 when depressing force of 1 [N] is applied to one corner part of the operation surface 24 of the touch panel 23. When depressing force is applied to any one of four corner parts of the operation surface 24 of the touch panel 23, influence of the depression of the elastic member 33 appears remarkably at the position where the depressing force is applied as shown in FIG. 7. However, the positions of the other three corner parts among the four corner parts of the touch panel 23 have hardly shifted from "0" as the reference position.

As shown in FIG. 6 and FIG. 7, depending on the depressing position on the operation surface 24 of the touch panel 23, the condition of displacement of the touch panel 23 varies greatly and the values of the sensor signals D0_1-D0_$n$ outputted from the depressing force sensors 30_1-30_$n$ also vary greatly. Thus, when the depressing force is calculated based on the values of the sensor signals D0_1-D0_$n$ without taking into account the depressing position on the operation surface 24 of the touch panel 23, the accuracy of the depressing force drops. Therefore, in the touch panel device 1 and the depressing force calculation method according to the first embodiment, the depressing force calculation mode is switched depending on the position where the depressing force is applied.

(1-2) Operation

Figure 8:
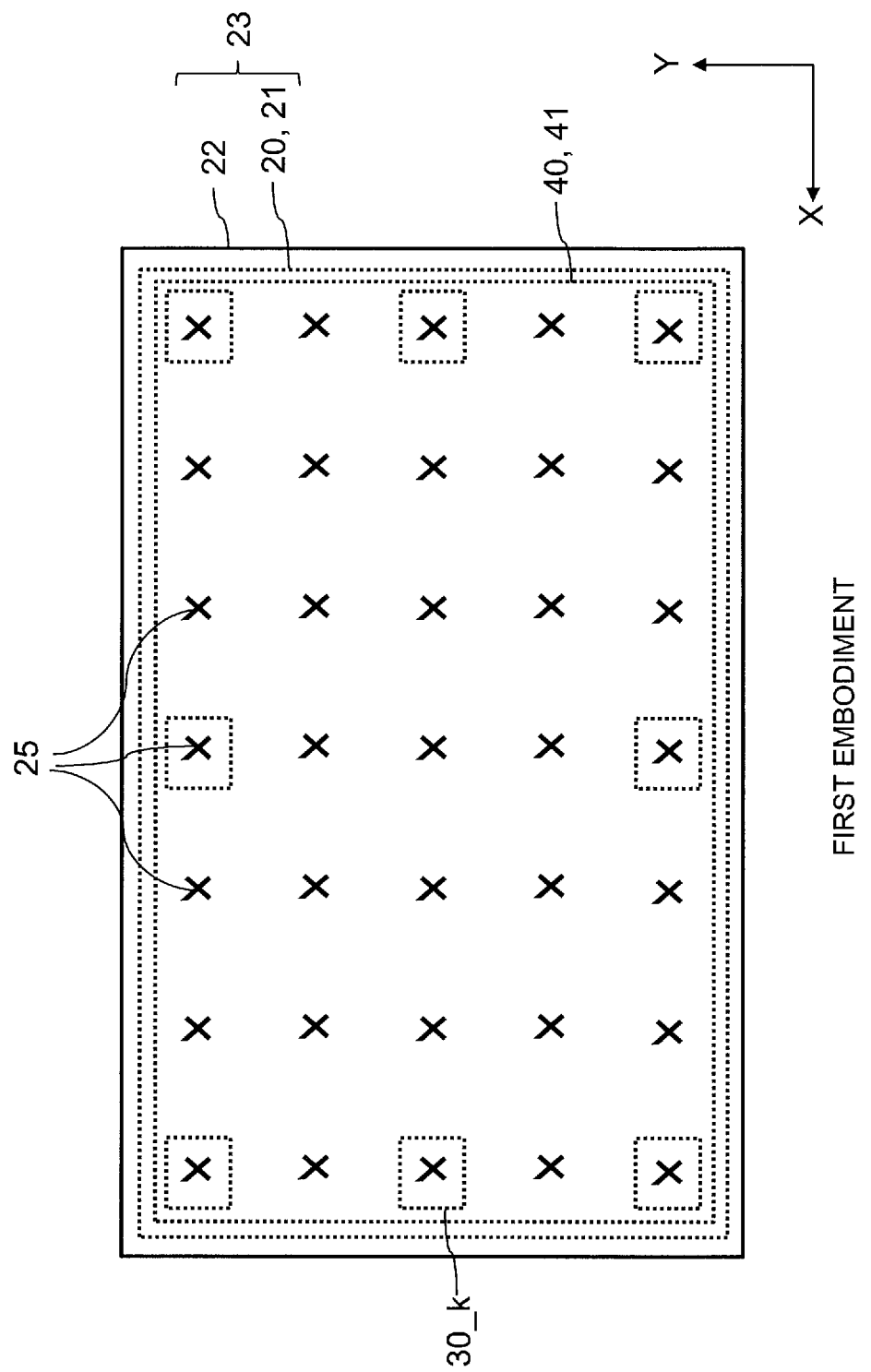
FIG. 8 is a plan view showing an example of a plurality of sets of coordinates used for a simulation for generating depressing force calculation modes regarding the touch panel device according to the first embodiment.
Figure 9:
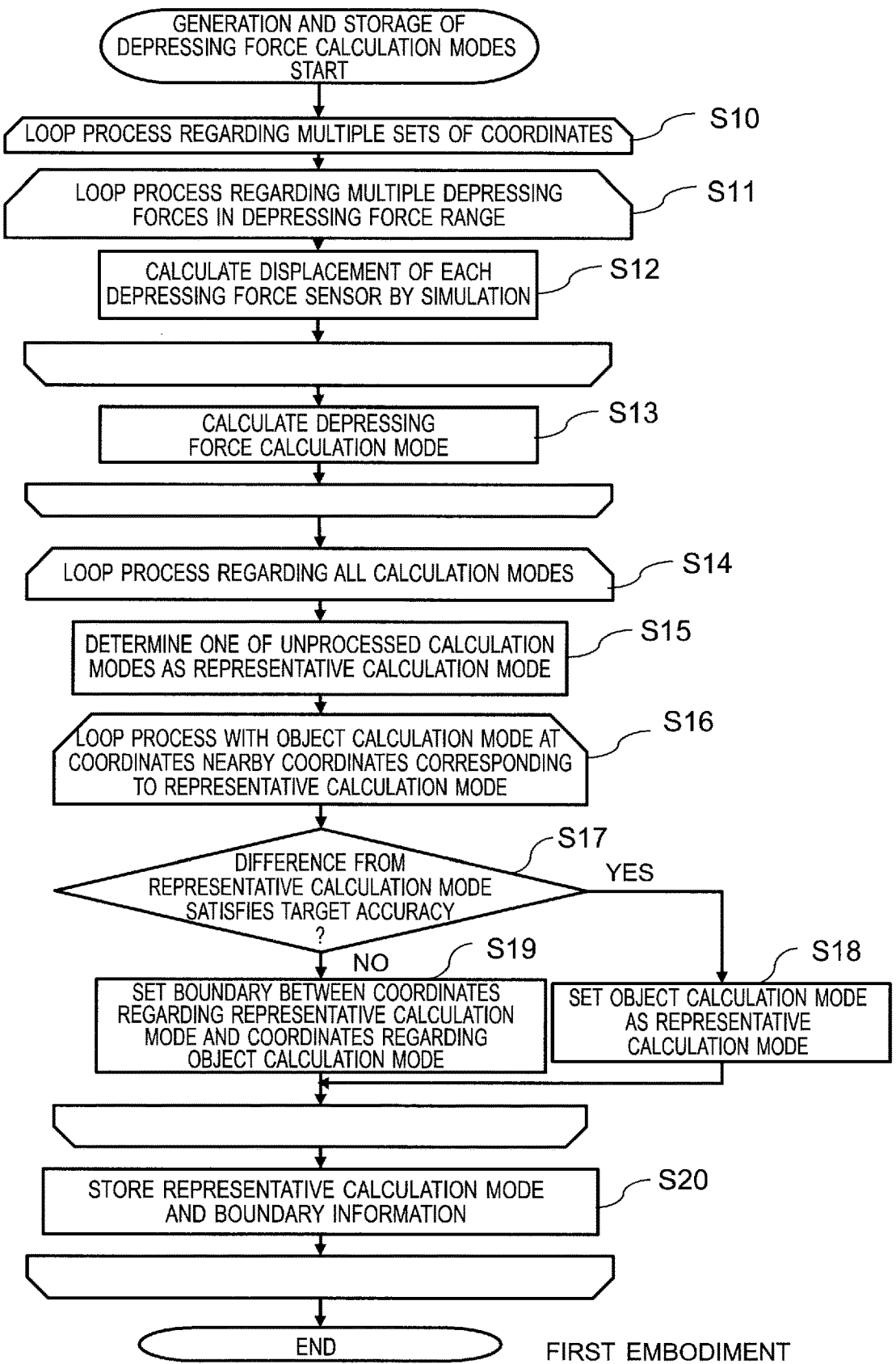
FIG. 9 is a flowchart showing a process for generating the depressing force calculation modes regarding the touch panel device according to the first embodiment.

First, a process of generating a plurality of depressing force calculation modes will be described. FIG. 8 is a plan view showing an example of a plurality of sets of coordinates 25 used for a simulation for generating the depressing force calculation modes regarding the touch panel device 1 according to the first embodiment. FIG. 9 is a flowchart showing a process for generating the depressing force calculation modes regarding the touch panel device 1 according to the first embodiment. The plurality of sets of coordinates 25 are arranged in the X direction and the Y direction at predetermined intervals. The plurality of sets of coordinates 25 are not limited to those shown in FIG. 8.

In step S10 in FIG. 9, the calculation mode generation unit 103 executes a loop process of steps S10 to S13 for each of the plurality of sets of coordinates 25 predetermined in the touch sensor 20.

In step S11, the calculation mode generation unit 103 executes a loop process of steps S11 to S12 for each of a plurality of depressing forces in a predetermined depressing force range. The plurality of depressing forces in the predetermined depressing force range are determined to have a constant depressing force interval, for example. In step S12, the calculation mode generation unit 103 calculates the displacement of each depressing force sensor 30_1-30_$n$ when a point at the touch coordinates determined in the step S10 is depressed with the depressing force determined in the step S11 by means of simulation.

In step S13, the calculation mode generation unit 103 generates the depressing force calculation mode to be used for calculating the depressing force f(P) by a calculation based on the displacement of each depressing force sensor 30_1-30_$p$ obtained in the step S12. In the case where there are n depressing force sensors 30_1-30_$n$, the depressing force calculation mode is defined by the following expression (1), for example:

$$f(P) = \sum_{j=1}^{n} k_j \cdot p_j \quad (1)$$

In the above calculation formula, n is a positive integer. P is defined as P={$p_1, p_2, \ldots, p_n$}. The characters $p_1$ to $p_n$ represent the values of detection signals outputted from the depressing force sensors 30_1-30_$n$, namely, the detection values D1_1-D1_$n$. The characters $k_1$ to $k_n$ are coefficients representing weights used for weighted addition of the detection values $p_1$ to $p_n$. Thus, the sets of the coefficients $k_1$ to $k_n$ of the plurality of depressing force calculation modes differ from each other.

When the loop process of the steps S10 to S13 is over, the process advances to step S14. In the step S14, the calculation mode generation unit 103 executes a loop process of steps S14 to S20 for each of the plurality of depressing force calculation modes generated.

In step S15, the calculation mode generation unit 103 selects one of unprocessed calculation modes as a representative calculation mode.

Subsequently, the calculation mode generation unit 103 executes a loop process of steps S16 to S19 for an object calculation mode at coordinates in the vicinity of the coordinates of the representative calculation mode.

In step S17, for example, the calculation mode generation unit 103 judges whether or not the difference between the value of f(P) obtained by the representative calculation mode and the value of f(P) obtained by the object calculation mode satisfies predetermined target accuracy. For example, in the case where the calculation mode is defined by the expression (1), the calculation mode generation unit 103 judges whether the difference satisfies the predetermined target accuracy or not by using the sum total of absolute values of the coefficients $k_1$ to $k_n$ in the case of the representative calculation mode and the sum total of absolute values of the coefficients $k_1$ to $k_n$ in the case of the object calculation mode, a magnitude relationship between the coefficients $k_1$ to $k_n$ in the case of the representative calculation mode and the coefficients $k_1$ to $k_n$ in the case of the object calculation mode, ratios between the coefficients $k_1$ to $k_n$ in the case of the representative calculation mode and the coefficients $k_1$ to $k_n$ in the case of the object calculation mode, or the like. The process advances to step S18 when the difference satisfies the target accuracy, or to step S19 when the difference does not satisfy the target accuracy.

In the step S18, the calculation mode generation unit 103 sets the object calculation mode satisfying the target accuracy as a new representative calculation mode.

When the process advances to step S19, the calculation mode generation unit 103 sets a region boundary between the coordinates of the representative calculation mode and the coordinates of the object calculation mode.

After the loop process of the steps S16 to S19, the process advances to step S20 and the calculation mode generation unit 103 stores the representative calculation mode selected in the step S15 and the boundary (region) information obtained in the step S19.

The expression (1) shown as a depressing force calculation mode is just an example; a different calculation mode may be used as long as the depressing force calculated by using the calculation mode satisfies the target accuracy.

Further, in a case where the characteristic of the displacements of the depressing force sensors in the step S12 changes greatly due to a factor other than the touch coordinates (e.g., a change in the depressing force), it is also possible for the calculation mode generation unit 103 to employ a method in which the depressing force calculation mode is not determined uniquely even if the touch coordinates are constant. In this case, the calculation mode generation unit 103 may generate a table of values or ranges of the factor changing the characteristic of the displacements of the depressing force sensors and depressing force calculation modes corresponding to the values or ranges and store the table in the calculation mode storage unit. Furthermore, while the depressing force calculation modes are obtained by a simulation in the example of FIG. 8, it is also possible to obtain the depressing force calculation modes based on actual measurement.

Figure 10:
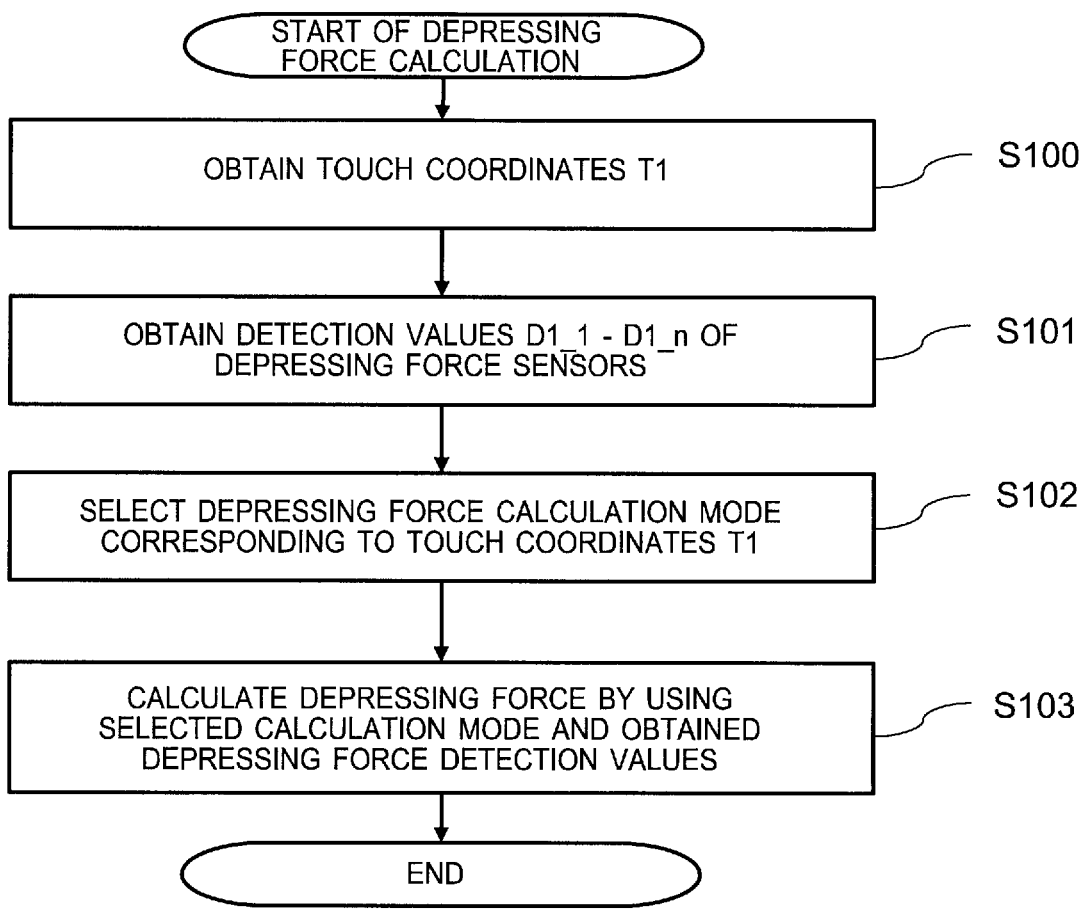
FIG. 10 is a flowchart showing a depressing force calculation process executed by a control device of the touch panel device according to the first embodiment.

FIG. 10 is a flowchart showing a depressing force calculation process executed by the control device 100 of the touch panel device 1 according to the first embodiment. In step S100, the coordinate detection unit 101 obtains the touch coordinates indicating the position of a touch point on the operation surface 24 of the touch panel 23. In step S101, the depressing force detection unit 102 obtains the detection values $D1\_1$-$D1\_n$ based on the sensor signals $D0\_1$-$D0\_n$ outputted from the depressing force sensors $30\_1$-$30\_n$.

In step S102, the depressing force calculation unit 105 selects a corresponding depressing force calculation mode among the plurality of depressing force calculation modes stored in the calculation mode storage unit 104 based on the touch coordinates obtained in the step S100 and loads the selected depressing force calculation mode.

In step S103, the depressing force calculation unit 105 calculates the depressing force by using the detection values $D1\_1$-$D1\_n$ obtained in the step S101 and the depressing force calculation mode loaded in in the step S102. In the case where the depressing force calculation mode is the aforementioned expression (1), the detection values $D1\_1$-$D1\_n$ are $P_1$-$P_n$.

(1-3) Effect

As described above, by using the touch panel device 1 according to the first embodiment or the depressing force calculation method shown in FIG. 9 or FIG. 10, an optimum calculation mode according to the touch coordinates T1 is used as the depressing force calculation mode, by which the accuracy of the calculation of the depressing force can be increased.

Further, since a depressing force calculation mode satisfying the target accuracy and each region of the touch sensor 20 have previously been stored while being associated with each other, the amount of arithmetic processing necessary for calculating the depressing force based on the touch coordinates T1 and the detection values $D1\_1$-$D1\_n$ can be reduced. Accordingly, the depressing force can be calculated efficiently.

(2) Second Embodiment

In a second embodiment, among the plurality of depressing force sensors $30\_1$-$30\_n$, a depressing force sensor at a position where the upward warp occurs to the touch panel 23 and a depressing force sensor at a position where the depression occurs to the touch panel 23 are driven parallelly. Namely, in the second embodiment, the depressing force sensor at the position where the upward warp occurs and the depressing force sensor at the position where the depression occurs are driven at the same time. The depressing force detection unit 102 detects, for example, total capacitance of the depressing force sensor at the position where the upward warp occurs and the depressing force sensor at the position where the depression occurs, by which detection accuracy of the capacitance increases and the number of times of detecting the capacitance decreases.

Figure 11:
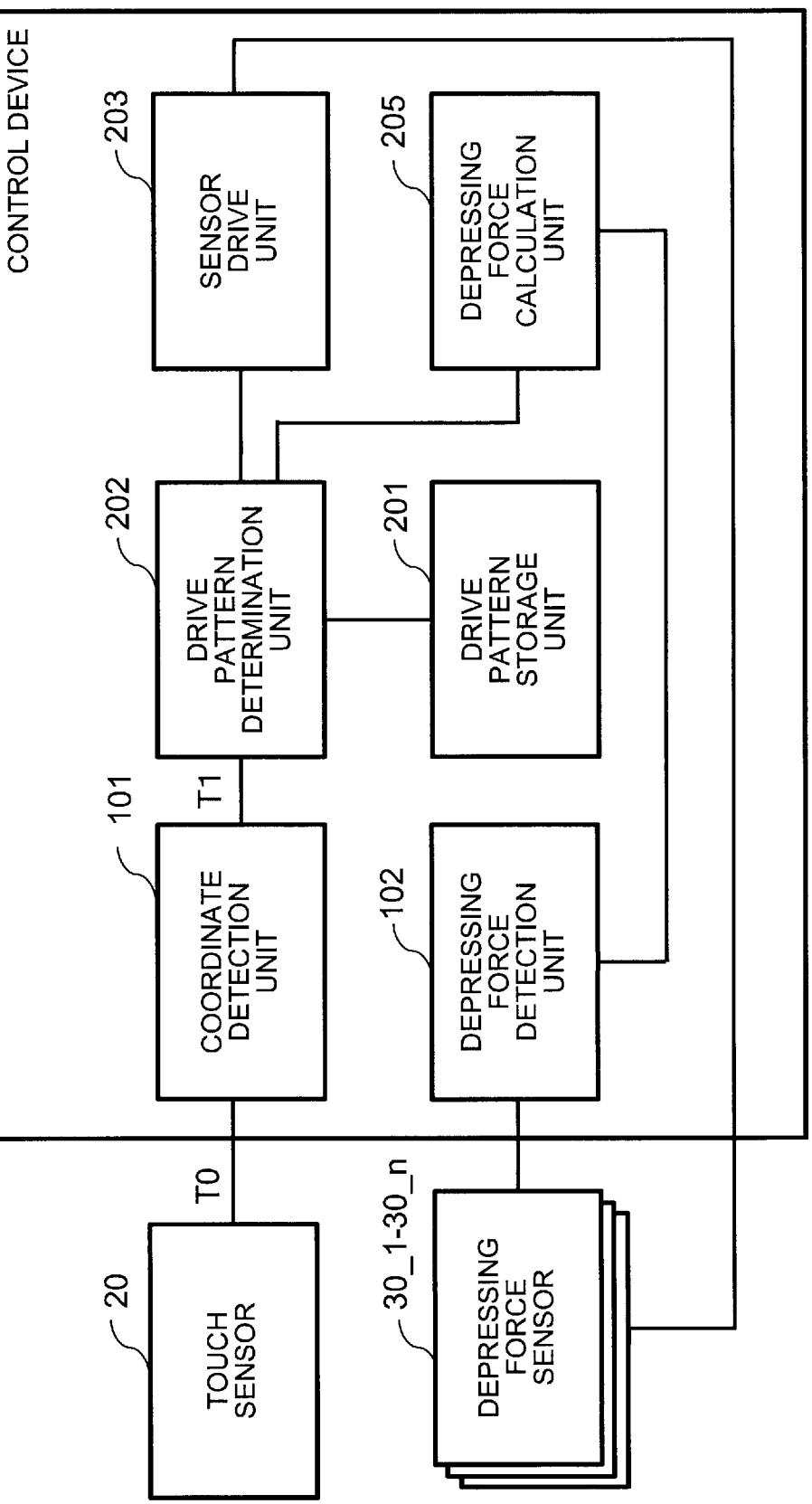
FIG. 11 is a functional block diagram schematically showing the configuration of a touch panel device according to a second embodiment of the present disclosure.

FIG. 11 is a functional block diagram schematically showing the configuration of a touch panel device 2 according to the second embodiment. In FIG. 11, each component identical or corresponding to a component shown in FIG. 4 is assigned the same reference character as in FIG. 4. As shown in FIG. 11, a control device 200 of the touch panel device 2 includes the coordinate detection unit 101, the depressing force detection unit 102, a drive pattern storage unit 201 that stores parallel drive patterns, a drive pattern determination unit 202 that loads a plurality of parallel drive patterns from the drive pattern storage unit 201 and switches a drive pattern to be used, a sensor drive unit 203 that drives the depressing force sensors, and a depressing force calculation unit 205. However, the drive pattern storage unit 201 does not necessarily have to be a part of the touch panel device 2. The drive pattern storage unit 201 can also be an external storage device connected to the touch panel device 2 to be capable of communication with the touch panel device 2.

Specifically, the control device 200 includes the drive pattern storage unit 201 that stores a plurality of regions on the operation surface 24 and a plurality of drive patterns of the plurality of depressing force sensors $30\_1$-$30\_n$ corresponding to the plurality of regions, the drive pattern determination unit 202 that selects a drive pattern regarding a region corresponding to the touch coordinates T1 from the plurality of drive patterns, the sensor drive unit 203 that drives depressing force sensors according to the selected drive pattern among the plurality of depressing force sensors, and the depressing force calculation unit 205 that calculates the depressing force by using detection values corresponding to the sensor signals outputted from the depressing force sensors according to the selected drive pattern.

The drive pattern storage unit 201 stores drive patterns of the depressing force sensors $30\_1$-$30\_n$ in consideration of the upward warp and the depression at the positions of the depressing force sensors $30\_1$-$30\_n$ corresponding to the touch coordinates T1. Each of the stored drive patterns indicates a combination of depressing force sensors driven at the same time, i.e., driven parallelly, corresponding to the touch coordinates T1 among the depressing force sensors $30\_1$-$30\_n$.

The drive pattern determination unit 202 selects one parallel drive pattern among the plurality of parallel drive patterns stored in the drive pattern storage unit 201 based on the touch coordinates T1 obtained by the coordinate detection unit 101 and loads the selected parallel drive pattern. The drive pattern determination unit 202 hands over the loaded parallel drive pattern to the sensor drive unit 203. According to the parallel drive pattern received, the sensor drive unit 203 drives depressing force sensors specified by the parallel drive pattern among the depressing force sensors $30\_1$-$30\_n$.

The depressing force calculation unit 205 receives the detection values of the parallelly driven depressing force sensors. The depressing force calculation unit 205 calculates the depressing force by using the detection values of the parallelly driven depressing force sensors.

Figure 12A:
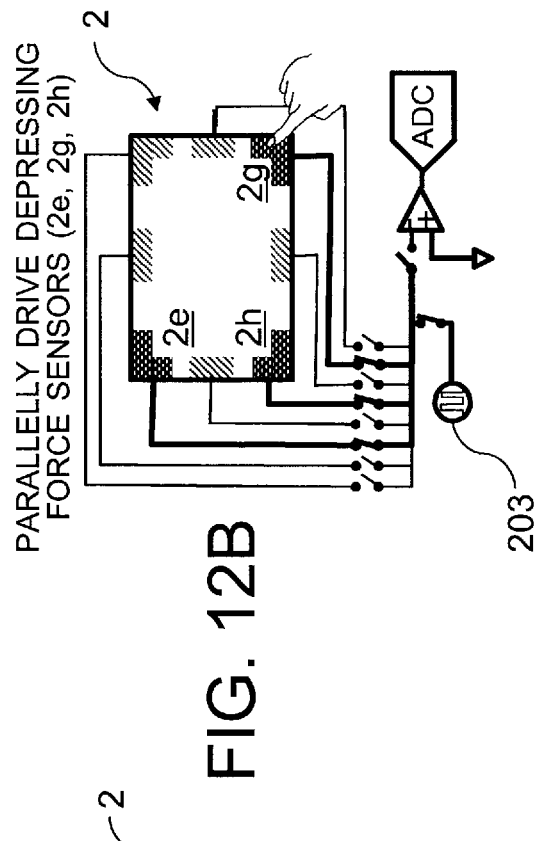
FIGS. 12A to 12D are diagrams showing a process of driving depressing force sensors in the touch panel device according to the second embodiment.
Figure 12B:
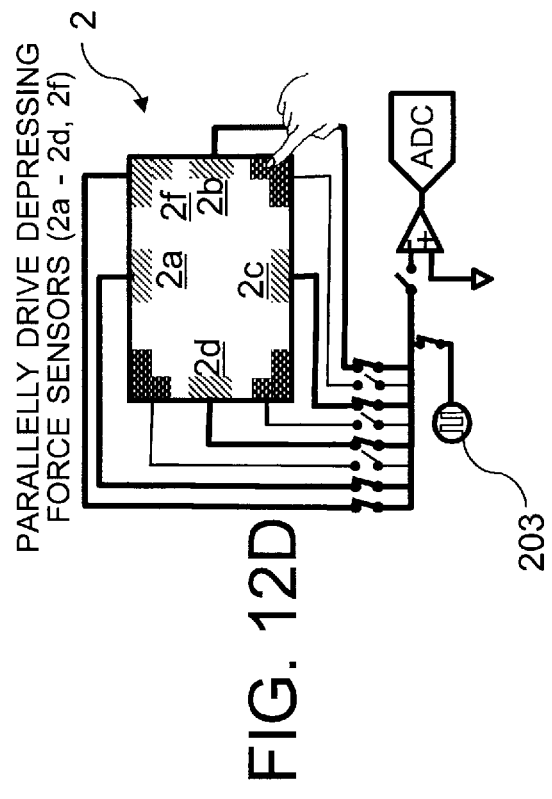
Figure 12C:
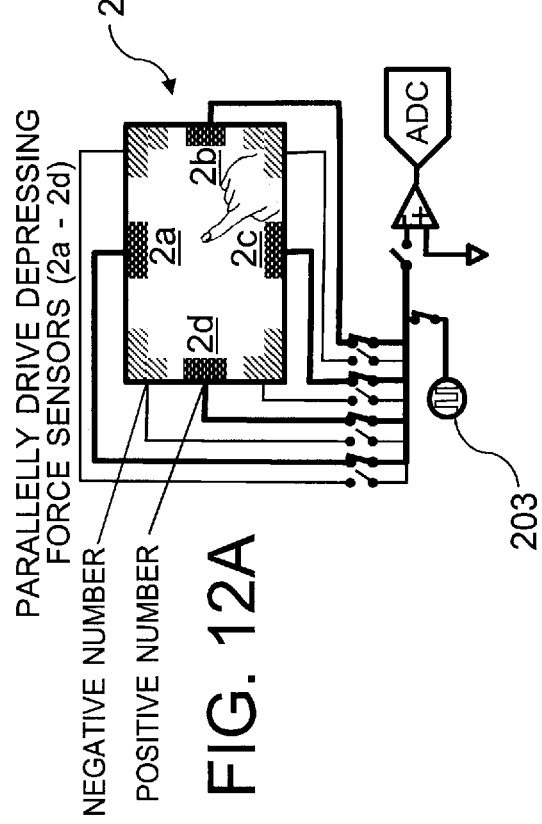
Figure 12D:
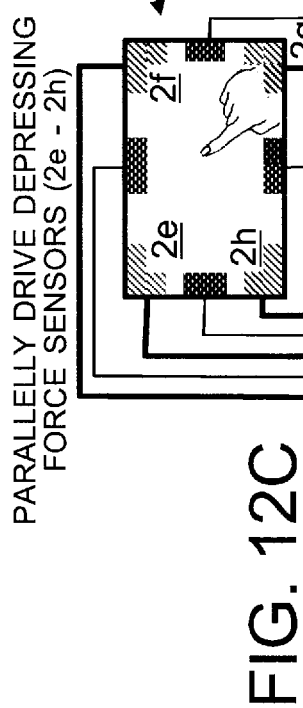

FIGS. 12A to 12D are diagrams showing a process of driving the depressing force sensors $30\_1$-$30\_n$ in the touch panel device 2 according to the second embodiment. FIGS. 12A and 12C indicate a case where depressing force is applied to the central part of the operation surface 24 of the touch panel 23, while FIGS. 12B and 12D indicate a case where depressing force is applied to a corner part of the operation surface 24 of the touch panel 23. Further, FIGS. 12A and 12B show the parallel driving of depressing force sensors in a case where the depression occurs to the touch panel 23, while FIGS. 12C and 12D show the parallel driving of depressing force sensors in a case where the upward warp occurs to the touch panel 23.

The sensor drive unit 203 parallelly drives some depressing force sensors among the depressing force sensors 30_1-30_n according to the parallel drive pattern corresponding to the touch coordinates T1. FIG. 12A shows an example of parallelly driving depressing force sensors 2a, 2b, 2c and 2d at positions where the depression occurs (i.e., whose sensor values are positive numbers). FIG. 12B shows an example of parallelly driving depressing force sensors 2e, 2g and 2h at positions where the depression occurs (i.e., whose sensor values are positive numbers). FIG. 12C shows an example of parallelly driving depressing force sensors 2e, 2f, 2g and 2h at positions where the upward warp occurs (i.e., whose sensor values are negative numbers). FIG. 12D shows an example of parallelly driving depressing force sensors 2a, 2b, 2c, 2d and 2f at positions where the upward warp occurs (i.e., whose sensor values are negative numbers). The depressing force calculation unit 205 calculates the depressing force by using the depressing force sensor values obtained by the parallel driving. The calculation of the depressing force is carried out by, for example, subtracting the depressing force detected in FIG. 12C from the depressing force detected in FIG. 12A, subtracting the depressing force detected in FIG. 12D from the depressing force detected in FIG. 12B, or the like.

Figure 13:
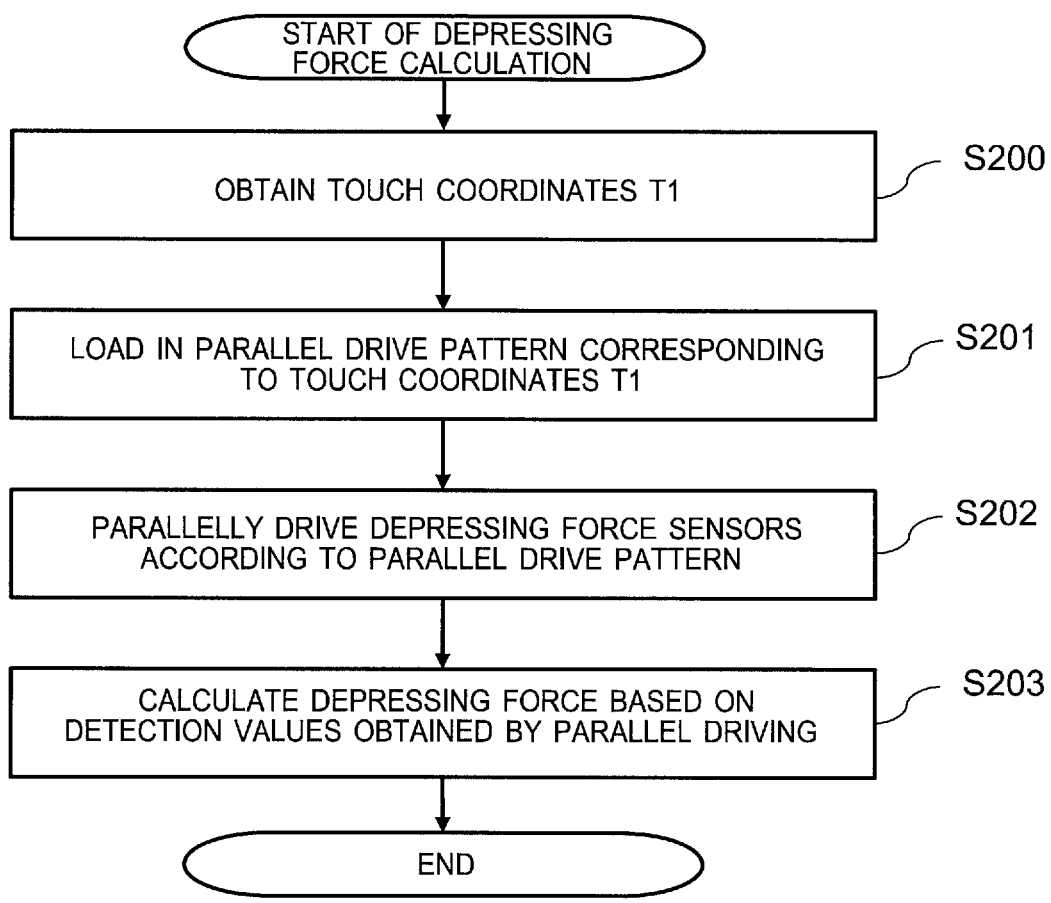
FIG. 13 is a flowchart showing a depressing force calculation process executed by a control device of the touch panel device according to the second embodiment.

FIG. 13 is a flowchart showing a depressing force calculation process executed by the control device 200 of the touch panel device 2 according to the second embodiment. In step S200, the coordinate detection unit 101 obtains the touch coordinates T1 indicating the position of the touch point on the operation surface 24 of the touch panel 23.

In step S201, the drive pattern determination unit 202 selects a corresponding drive pattern from the plurality of drive patterns stored in the drive pattern storage unit 201 based on the touch coordinates T1 obtained in the step S200 and loads the selected drive pattern.

In step S202, the sensor drive unit 203 parallelly drives a plurality of depressing force sensors among the depressing force sensors 30_1-30_n by using the drive pattern loaded in in the step S201. It is also possible to select the parallelly driven depressing force sensors while limiting the number of the parallelly driven depressing force sensors in order to measure the depressing force in a detection range of high accuracy.

In step S203, the depressing force calculation unit 205 calculates the depressing force based on the values detected by the parallel driving of depressing force sensors in the step S202.

In a case where the positive or negative sign of the sensor signals outputted from the depressing force sensors changes due to a factor other than the touch coordinates T1 (e.g., a change in the depressing force), the drive pattern is not determined uniquely even if the touch coordinates are constant. In this case, the depressing force calculation unit 205 may generate and store a table of values or ranges of the factor changing the positive or negative sign of the depressing force sensors and drive patterns corresponding to the values or ranges.

As described above, by using the touch panel device 2 or the depressing force calculation method according to the second embodiment, the accuracy of the depressing force sensors can be increased by switching the drive pattern of the depressing force sensors depending on the touch coordinates T1 and parallelly driving depressing force sensors accordingly. Further, the number of times of detection by each depressing force sensor can be reduced and the detection load can be reduced. Furthermore, the accuracy of the calculation of the depressing force can be increased since an optimum drive pattern is used as the drive pattern.

(3) Third Embodiment

In a third embodiment, a description will be given of an example in which a depressing force sensor at a position where the upward warp occurs to the touch panel 23 is specified as a reference electrode and a depressing force sensor at a position where the depression occurs to the touch panel 23 is specified as a detection electrode among the plurality of depressing force sensors 30_1-30_n and influence of external disturbance noise is reduced by differential driving of depressing force sensors.

Figure 14:
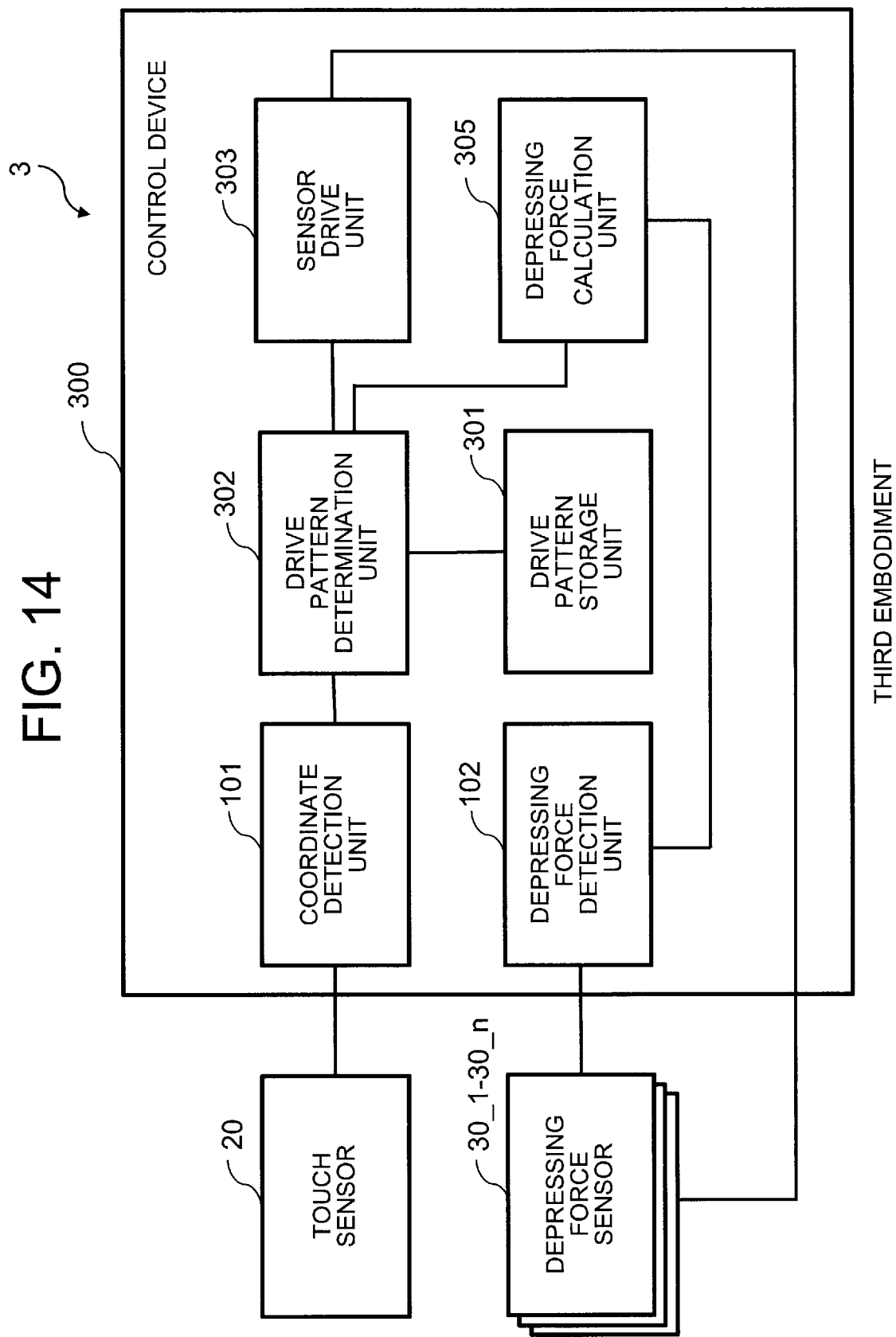
FIG. 14 is a functional block diagram schematically showing the configuration of a touch panel device according to a third embodiment of the present disclosure.

FIG. 14 is a functional block diagram schematically showing the configuration of a touch panel device 3 according to the third embodiment. In FIG. 14, each component identical or corresponding to a component shown in FIG. 4 is assigned the same reference character as in FIG. 4. As shown in FIG. 14, a control device 300 of the touch panel device 3 includes the coordinate detection unit 101, the depressing force detection unit 102, a drive pattern storage unit 301 that stores differential drive patterns, a drive pattern determination unit 302 that loads a differential drive pattern from the drive pattern storage unit 301 and switches a drive pattern to be used, a sensor drive unit 303 that drives the depressing force sensors, and a depressing force calculation unit 305. However, the drive pattern storage unit 301 does not necessarily have to be a part of the touch panel device 3. The drive pattern storage unit 301 can also be an external storage device connected to the touch panel device 3 to be capable of communication with the touch panel device 3.

The drive pattern storage unit 301 stores differential drive patterns of the depressing force sensors 30_1-30_n in consideration of the upward warp and the depression at the positions of the depressing force sensors 30_1-30_n corresponding to the touch coordinates T1. Each of the stored differential drive patterns indicates the order of driving the depressing force sensors 30_1-30_n or the like corresponding to the touch coordinates T1.

The drive pattern determination unit 302 selects one drive pattern among the plurality of drive patterns stored in the drive pattern storage unit 301 based on the touch coordinates T1 obtained by the coordinate detection unit 101 and loads the selected drive pattern. The drive pattern determination unit 302 hands over the loaded drive pattern to the sensor drive unit 303. The sensor drive unit 303 drives the depressing force sensors 30_1-30_n according to the drive pattern.

The depressing force calculation unit 305 receives the detection values of the differentially driven depressing force sensors. The depressing force calculation unit 305 calculates the depressing force by using the detection values of the differentially driven depressing force sensors.

Figure 15A:
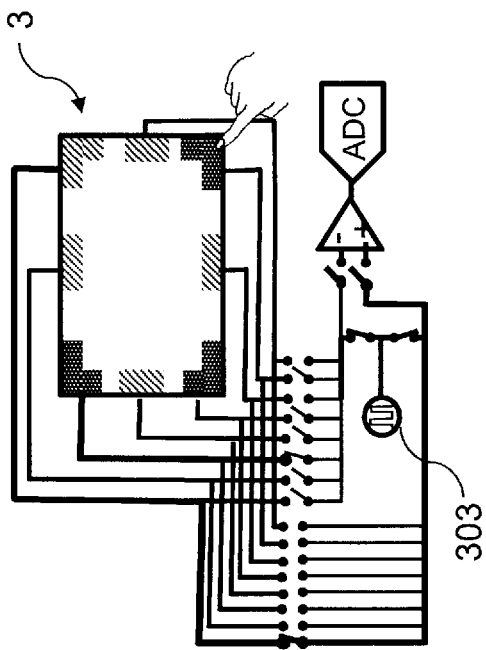
FIGS. 15A and 15B are diagrams showing a depressing force calculation process in the touch panel device according to the third embodiment.
Figure 15B:
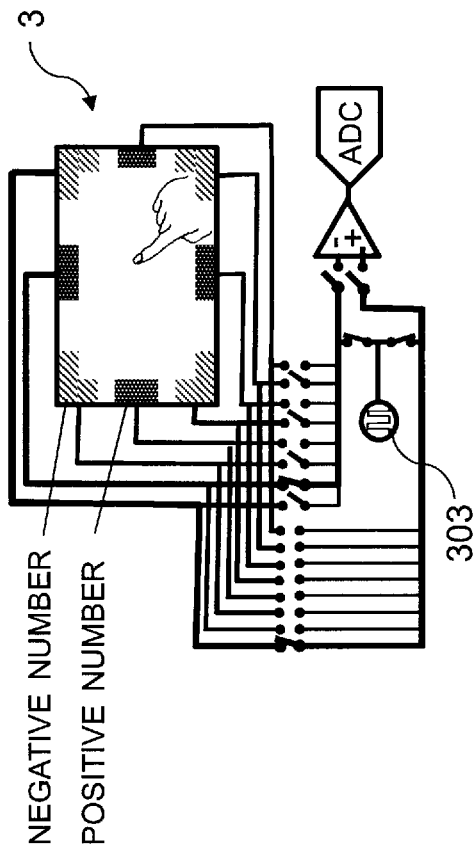

FIGS. 15A and 15B are diagrams showing an example of the differential driving of the depressing force sensors 30_1-30_n. FIG. 15A shows a case where depressing force is applied to the central part of the operation surface 24 of the touch panel 23, while FIG. 15B shows a case where depressing force is applied to a corner part of the operation surface 24 of the touch panel 23. The sensor drive unit 303 drives the depressing force sensors according to the differential drive pattern corresponding to the touch position. The sensor electrode of a depressing force sensor at a position where the upward warp occurs to the touch panel 23 (i.e., whose sensor value is a negative number) is specified as a reference electrode, the sensor electrode of a depressing force sensor at a position where the depression occurs (i.e., whose sensor value is a positive number) is specified as a detection electrode, and the depressing force is calculated based on the difference between the capacitance of the capacitor including the reference electrode and the capacitance of the capacitor including the detection electrode.

Figure 16:
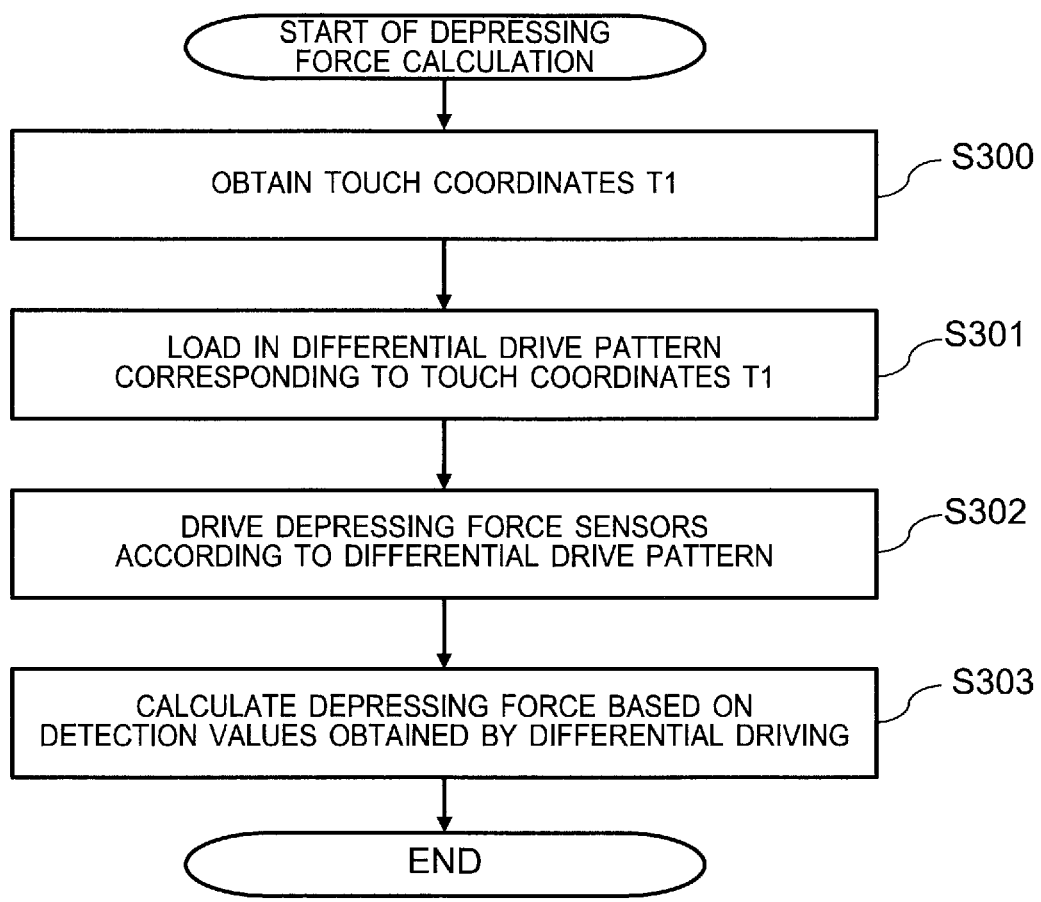
FIG. 16 is a flowchart showing the depressing force calculation process executed by a control device of the touch panel device according to the third embodiment.

FIG. 16 is a flowchart showing a depressing force calculation process executed by the control device 300 of the touch panel device 3 according to the third embodiment. In step S300, the coordinate detection unit 101 obtains the touch coordinates T1 indicating the position of the touch point on the operation surface 24 of the touch panel 23.

In step S301, the drive pattern determination unit 302 selects a corresponding differential drive pattern from the plurality of differential drive patterns stored in the drive pattern storage unit 301 based on the touch coordinates T1 obtained in the step S300 and loads the selected differential drive pattern.

In step S302, by using the differential drive pattern loaded in in the step S301, the sensor drive unit 303 differentially drives depressing force sensors based on the drive pattern among the depressing force sensors 30_1-30_n. It is also possible to select the differentially driven depressing force sensors while limiting the number of the differentially driven depressing force sensors in order to measure the depressing force in a detection range of high accuracy.

In step S303, the depressing force calculation unit 305 calculates the depressing force based on the values detected by the differential driving of depressing force sensors in the step S302.

When the positive or negative sign of the depressing force sensors changes due to a factor other than the touch coordinates T1 (e.g., a change in the depressing force), there are cases where the differential drive pattern is not determined uniquely even if the touch coordinates are constant. In such cases, the depressing force calculation unit 305 may generate and store a table of values or ranges of the factor changing the positive or negative sign of the depressing force sensors and differential drive patterns corresponding to the values or ranges.

As described above, by using the touch panel device 3 or the depressing force calculation method according to the third embodiment, the influence of the external disturbance noise can be canceled by switching the differential drive pattern of the depressing force sensors depending on the touch coordinates and differentially driving depressing force sensors accordingly.

Further, great displacements can be sensed efficiently by detecting the difference between the upward warp and the depression.

Furthermore, by combining this embodiment with the parallel driving described in the second embodiment, it is possible to execute the depressing force detection regarding the whole of the operation surface 24 of the touch panel 23 by performing the detection by depressing force sensors only once.

Incidentally, in the second embodiment and the third embodiment, it is also possible to execute efficient depressing force detection depending on the finger position by combining two or more parallel drive patterns or differential patterns so that detection accuracy of the depressing force sensors increases.

(4) Fourth Embodiment

In a fourth embodiment, the depressing force calculation mode is switched between a case of a single touch operation as a touch operation in which one finger makes contact with the operation surface 24 of the touch panel 23 and a case of a multi-touch operation as a touch operation in which a plurality of fingers make contact with the operation surface 24 of the touch panel 23. In the fourth embodiment, a description will be given of an example of reducing deterioration in the depressing force calculation accuracy at the time of the multi-touch operation.

Figure 17:
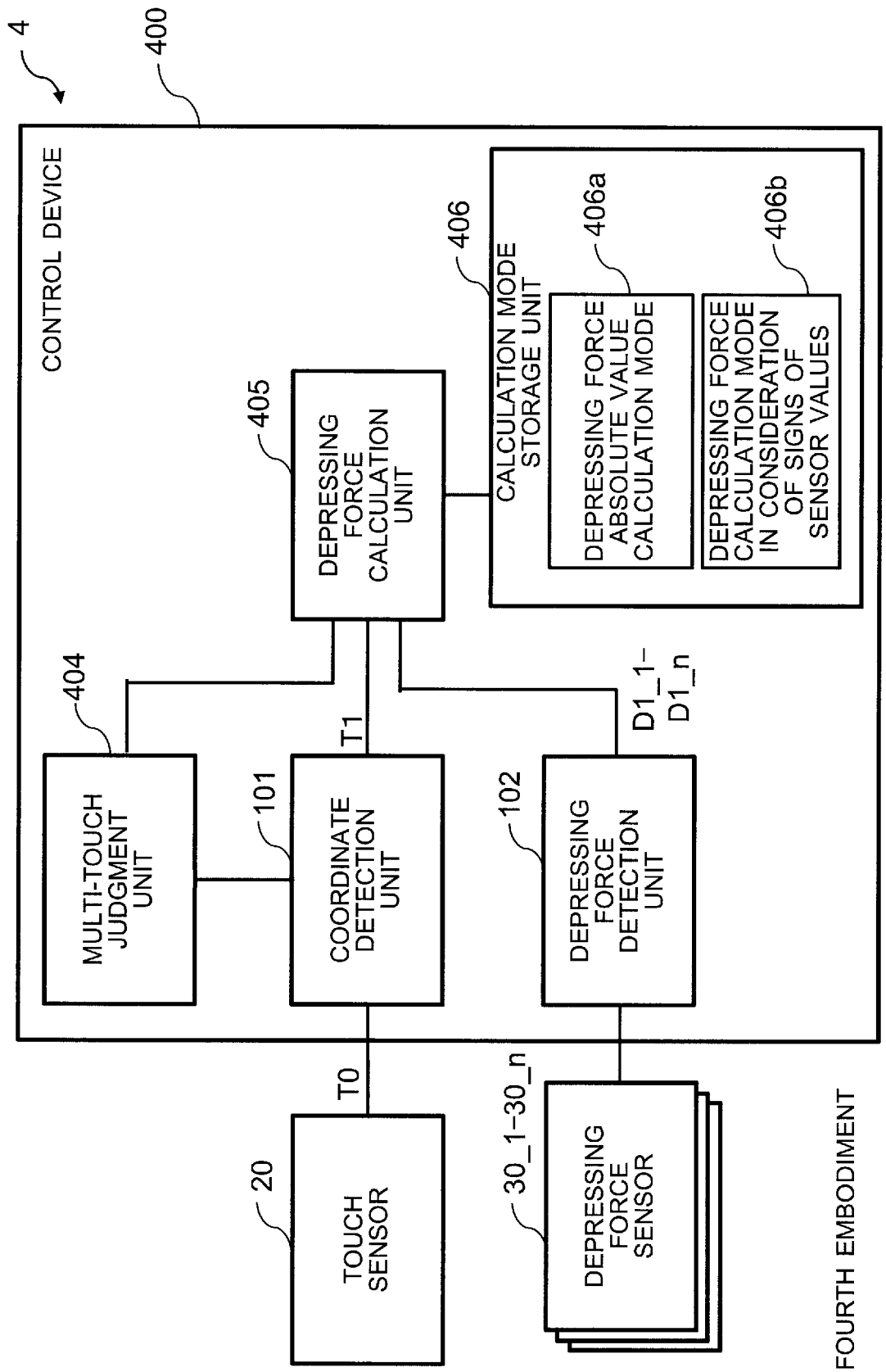
FIG. 17 is a functional block diagram schematically showing the configuration of a touch panel device according to a fourth embodiment of the present disclosure.

FIG. 17 is a functional block diagram schematically showing the configuration of a touch panel device 4 according to the fourth embodiment. In FIG. 17, each component identical or corresponding to a component shown in FIG. 4 is assigned the same reference character as in FIG. 4. As shown in FIG. 17, a control device 400 of the touch panel device 4 includes the coordinate detection unit 101, the depressing force detection unit 102, a multi-touch judgment unit 404, a calculation mode storage unit 406 and a depressing force calculation unit 405.

Specifically, the control device 400 includes the depressing force detection unit 102 that obtains a plurality of detection values corresponding to the sensor signals when depressing force is applied to the operation surface 24, the multi-touch judgment unit 404 that judges whether the touch operation is the single touch operation or the multi-touch operation, the calculation mode storage unit 406 that stores depressing force calculation modes for a case where the single touch operation is performed and a depressing force calculation mode for a case where the multi-touch operation is performed, and the depressing force calculation unit 405 that selects a depressing force calculation mode from the calculation mode storage unit depending on the touch operation and calculates the depressing force by using the selected depressing force calculation mode and a plurality of detection values. However, the calculation mode storage unit 406 does not necessarily have to be a part of the touch panel device 4. The calculation mode storage unit 406 can also be an external storage device connected to the touch panel device 4 to be capable of communication with the touch panel device 4.

The multi-touch judgment unit 404 judges whether the touch operation performed on the operation surface 24 is the single touch operation or the multi-touch operation. The depressing force calculation unit 405 selects one of the depressing force calculation modes stored in the calculation mode storage unit 406 based on the result of the judgment by the multi-touch judgment unit 404 and the touch coordinates T1 detected by the coordinate detection unit 101 and loads the selected depressing force calculation mode. The calculation mode storage unit 406 has stored a depressing force absolute value calculation mode 406a and depressing force calculation modes 406b in consideration of the positive or negative sign of the sensor values. The depressing force calculation modes 406b are calculation modes in consideration of the sensor value of a depressing force sensor at a position where the upward warp occurs to the touch panel 23 (i.e., whose sensor value is a negative number) and the sensor value of a depressing force sensor at a position where the depression occurs to the touch panel 23 (i.e., whose sensor value is a positive number).

The depressing force absolute value calculation mode 406a is a depressing force calculation mode without consideration for whether the sensor values as the values of the sensor signals D0_1-D0_n outputted from the depressing force sensors 30_1-30_n are positive numbers or negative numbers. The depressing force absolute value calculation mode 406a is a method in which the sum of absolute values of the amounts of change in the detection values of the depressing force sensors from the detection values outputted from the depressing force detection unit 102 when there is no touch operation or in a state of the previous touch operation is obtained as the depressing force. Let $p0_1$-$p0_n$ represent the sensor values outputted from the depressing force detection unit 102 when there is no touch operation or in the state of the previous touch operation, $p1_1$-$p1_n$ represent the detection values outputted from the depressing force detection unit 102 in the present touch operation, and $|p0_1$-$p1_1|$, $|p0_2$-$p1_2|$, ..., $|p0_n$-$p1_n|$ represent the absolute values of the amounts of change, the depressing force $f_0(P)$ is represented by the following expression (2):

$$f_0(P) = \sum_{j=1}^{n} |p0_j - p1_j| \quad (2)$$

Figure 18:
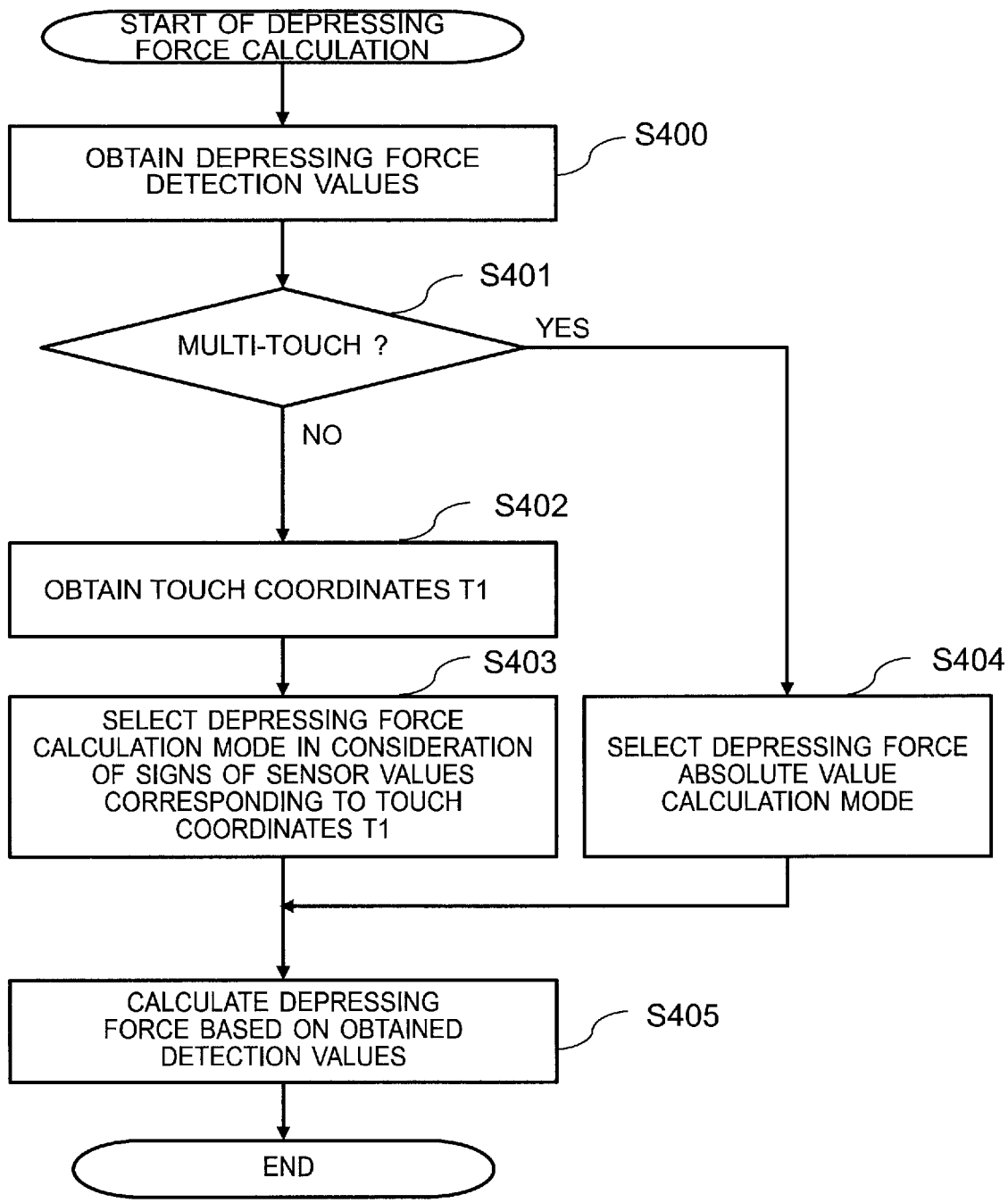
FIG. 18 is a flowchart showing a depressing force calculation process executed by a control device of the touch panel device according to the fourth embodiment.

FIG. 18 is a flowchart showing a depressing force calculation process executed by the control device 400 of the touch panel device 4. In step S400, the depressing force detection unit 102 obtains the detection values D1_1-D1_$n$ (=$p1_1$-$p1_n$) of all the depressing force sensors 30_1-30_$n$.

In step S401, the multi-touch judgment unit 404 judges whether the touch operation is the single touch operation or the multi-touch operation. The process advances to step S402 and S403 when the touch operation is the single touch operation, or to step S404 when the touch operation is the multi-touch operation.

In step S402, the coordinate detection unit 101 obtains the touch coordinates T1. In the next step S403, the depressing force calculation unit 405 loads a calculation mode from the depressing force calculation modes 406b in consideration of the sensor values stored in the calculation mode storage unit 406 based on the touch coordinates obtained in the step S402.

When the process advances from the step S401 to the step S404, the depressing force calculation unit 405 loads the depressing force absolute value calculation mode 406a stored in the calculation mode storage unit 406.

In step S405, the depressing force calculation unit 405 calculates the depressing force by using the detection values D1_1-D1_$n$ detected in the step S400 and the calculation mode loaded in in the step S403 or the step S404.

Figure 19:
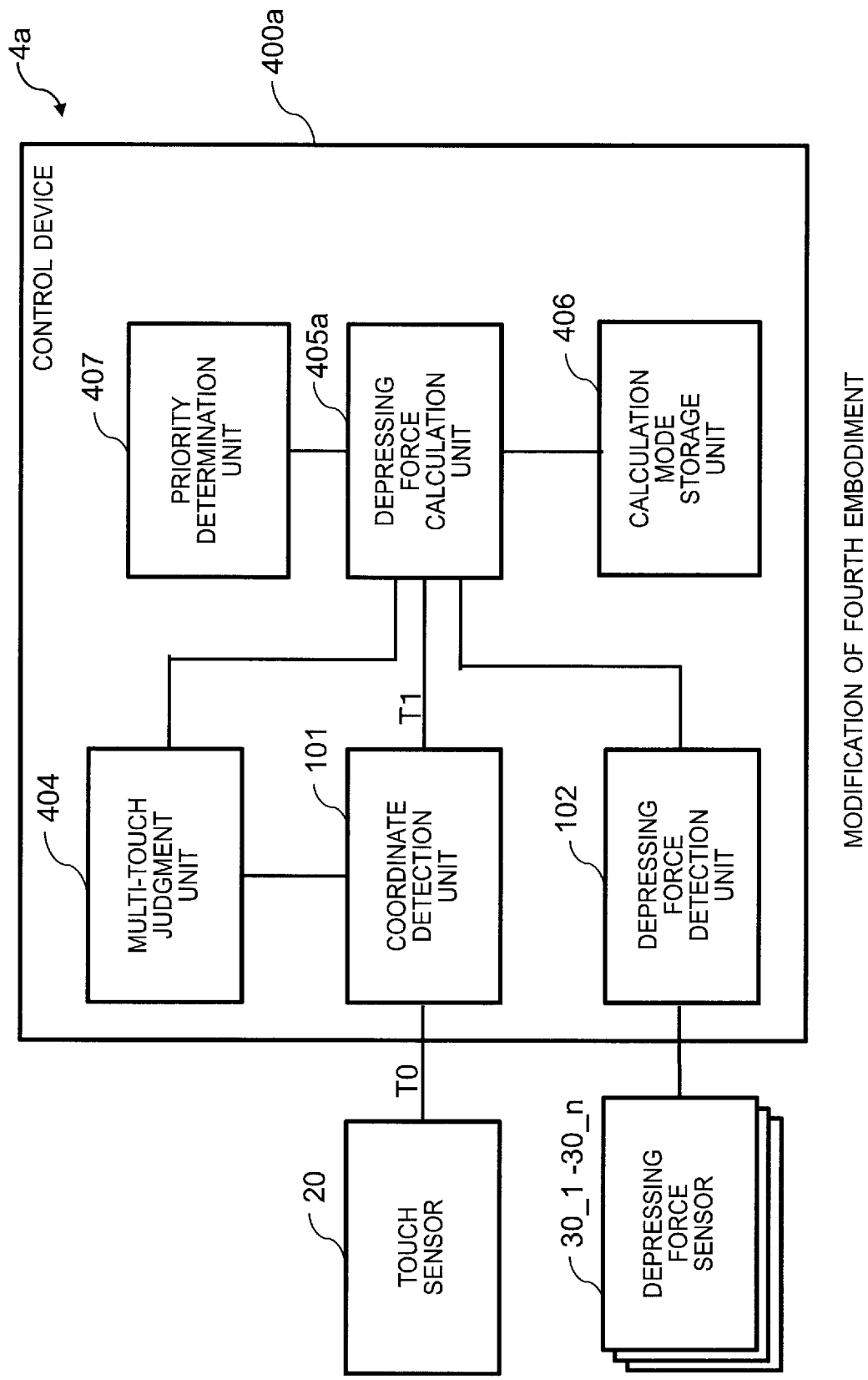
FIG. 19 is a functional block diagram schematically showing the configuration of a touch panel device according to a modification of the fourth embodiment.

FIG. 19 is a functional block diagram schematically showing the configuration of a touch panel device 4a according to a modification of the fourth embodiment. In FIG. 19, each component identical or corresponding to a component shown in FIG. 17 is assigned the same reference character as in FIG. 17. As shown in FIG. 19, a control device 400a of the touch panel device 4a includes the coordinate detection unit 101, the depressing force detection unit 102, the multi-touch judgment unit 404, the calculation mode storage unit 406, a priority determination unit 407 and a depressing force calculation unit 405a. For example, when the multi-touch operation is performed, the priority determination unit 407 determines which set of touch coordinates among the plurality of touch points should be used, namely, which touch point should be prioritized, as the touch coordinates used for the selection of a depressing force calculation mode stored in the calculation mode storage unit 406 or generation of a depressing force calculation mode.

The multi-touch judgment unit 404 judges whether the touch operation is the single touch operation or the multi-touch operation. The priority determination unit 407 determines priority of each depressing force calculation mode applied to each depressing force sensor based on the result of the judgment by the multi-touch judgment unit 404 and the touch coordinates T1 outputted from the coordinate detection unit 101. The depressing force calculation unit 405a generates a depressing force calculation mode to be applied to each depressing force sensor based on the priority of each depressing force calculation mode determined by the priority determination unit 407.

Figure 20:
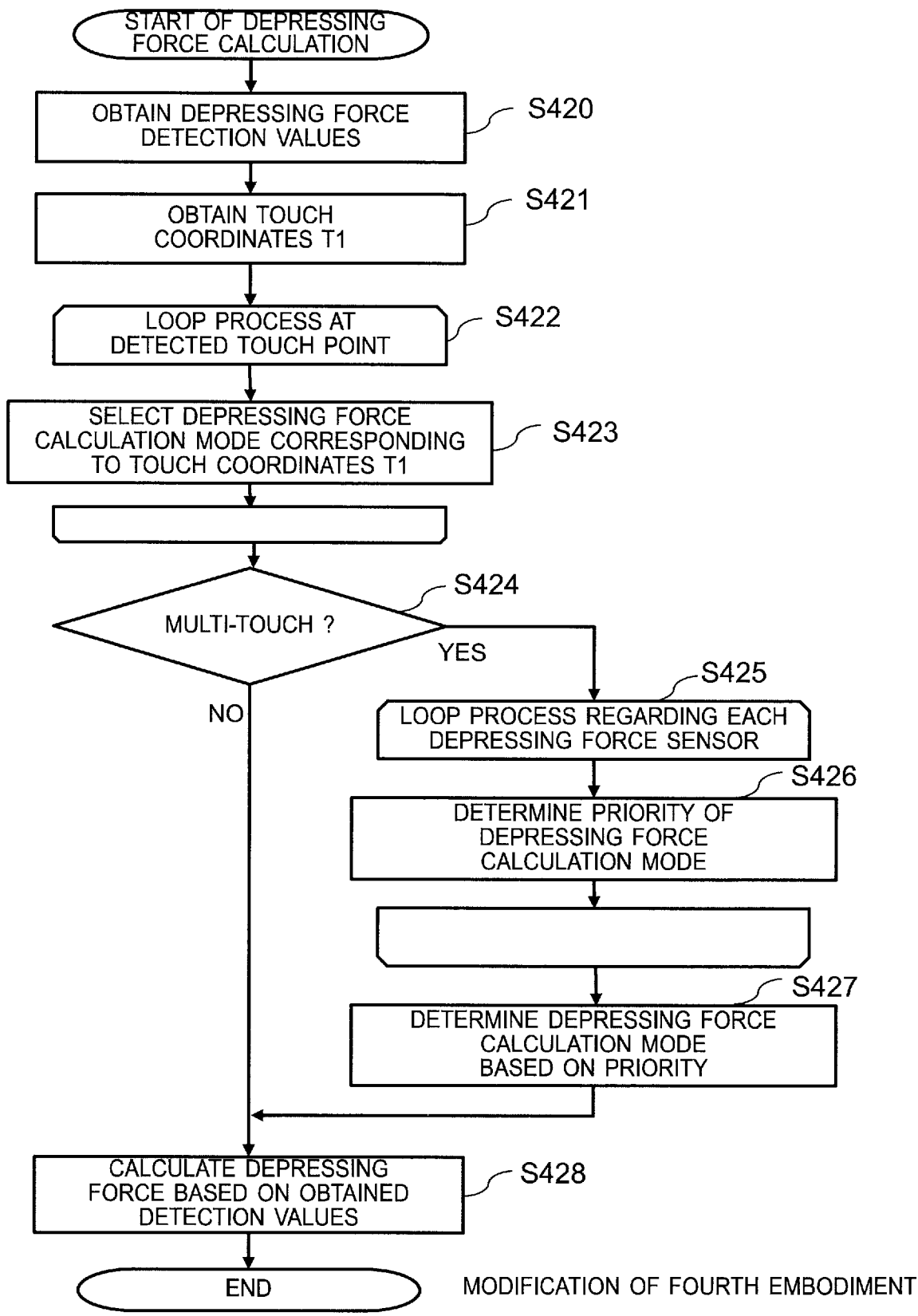
FIG. 20 is a flowchart showing a depressing force calculation process executed by a control device of the touch panel device of FIG. 19.

FIG. 20 is a flowchart showing a depressing force calculation process executed by the control device 400a of the touch panel device 4a. In step S420, the depressing force detection unit 102 obtains the detection values D1_1-D1_$n$ (=$p1_1$-$p1_n$) of all the depressing force sensors 30_1-30_$n$. In step S421, the coordinate detection unit 101 obtains the touch coordinates T1.

In a loop process of steps S422 to S423, the depressing force calculation unit 405a executes the step S423 at each set of touch coordinates. In the step S423, the depressing force calculation unit 405a loads a depressing force calculation mode corresponding to the touch coordinates T1 from the calculation mode storage unit 406.

In the step S424, the multi-touch judgment unit 404 judges whether the touch operation is the single touch operation or the multi-touch operation. When the touch operation is the multi-touch operation, a loop process of steps S425 to S426 and a process of step S427 are executed. In the loop process of the steps S425 to S426, the priority determination unit 407 determines the priority of the depressing force calculation mode loaded in in the step S423. The priority determination unit 407 determines the priority based on the distance between each set of touch coordinates and the depressing force sensor 30_$j$, for example. For example, the priority determination unit 407 sets the priority high for a touch point where the distance between the touch coordinates and the depressing force sensor 30_$j$ is short.

In the step S427, the depressing force calculation unit 405a generates a depressing force calculation mode based on the depressing force calculation mode loaded in the step S423 and the touch coordinates with high priority obtained in the step S426. Thus, in the generated depressing force calculation mode, a depressing force calculation mode corresponding to the closest touch coordinates among the plurality of touch points is applied to each depressing force sensor 30_$j$. Alternatively, the depressing force calculation mode may also be a method in which the degree of the application is changed by multiplying a coefficient corresponding to the distance from the depressing force sensor 30_$j$ to each set of touch coordinates and the calculation formula of the corresponding depressing force calculation mode together.

In step S428, the depressing force calculation unit 405a calculates the depressing force based on the depressing force sensor values detected in the step S420 by using the calculation mode loaded in the step S423 in the case of the single touch operation, or by using the calculation mode generated in the step S427 in the case of the multi-touch operation.

As described above, by using the touch panel device 4 or 4a, the deterioration in the depressing force calculation accuracy at the time of the multi-touch operation can be inhibited by switching the calculation mode between a case of the single touch operation and a case of the multi-touch operation.

(5) Fifth Embodiment

A touch panel device 5 according to a fifth embodiment includes an additional depressing force sensor 60_$j$ on the inside of the depressing force sensor 30_j and calculates the depressing force more accurately by calculating a bend angle of the touch panel 23.

Figure 21:
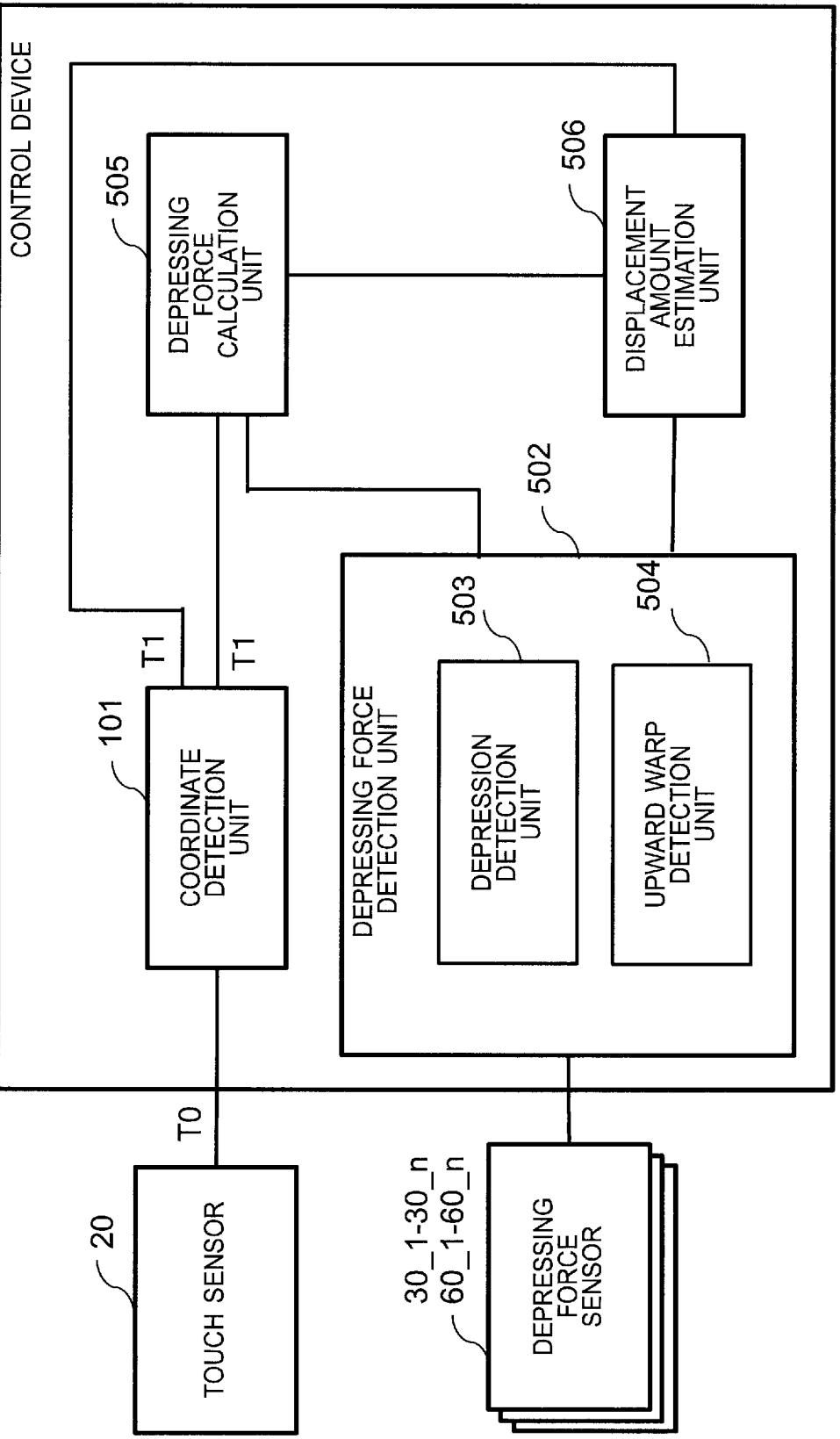
FIG. 21 is a functional block diagram schematically showing the configuration of a touch panel device according to a fifth embodiment of the present disclosure.

FIG. 21 is a functional block diagram schematically showing the configuration of the touch panel device 5 according to the fifth embodiment. In FIG. 21, each component identical or corresponding to a component shown in FIG. 4 is assigned the same reference character as in FIG. 4. As shown in FIG. 21, a control device 500 of the touch panel device 5 includes the coordinate detection unit 101, a depressing force detection unit 502, a displacement amount estimation unit 506 and a depressing force calculation unit 505. The depressing force detection unit 502 includes a depression detection unit 503 that detects the degree of the depression (referred to also as a "depression amount") based on the depressing force detection values and an upward warp detection unit 504 that detects the degree of the upward warp (referred to also as an "upward warp amount") based on the depressing force detection values.

Specifically, the control device 500 includes the displacement amount estimation unit 506 that calculates the bend angle of the touch panel 23 (i.e., bend angle of the protective glass 22) based on a plurality of detection values outputted from the depressing force detection unit 502 and calculates a displacement amount of the touch panel 23 based on the bend angle and the touch coordinates and the depressing force calculation unit 505 that calculates the depressing force based on the displacement amount and rigidity of the touch panel 23.

Figure 22:
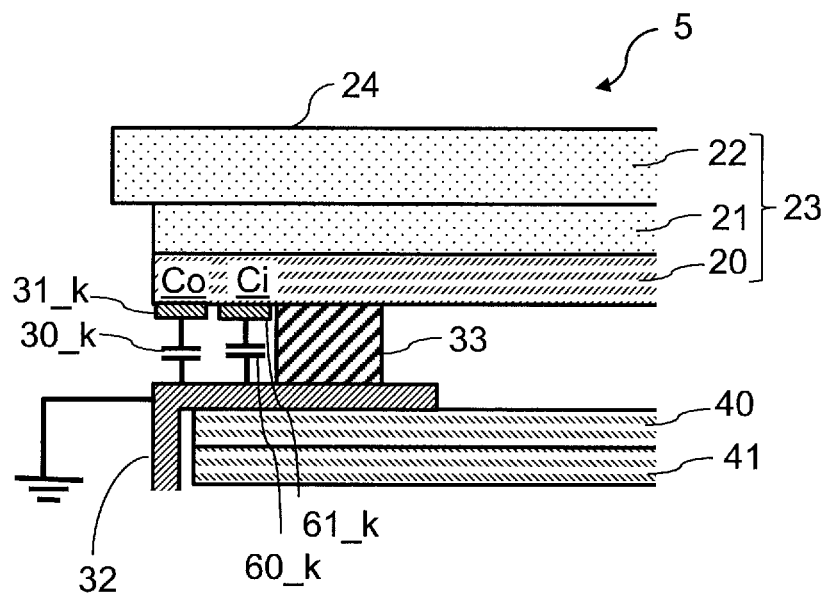
FIG. 22 is a schematic cross-sectional view showing a touch panel in the fifth embodiment.
Figure 23:
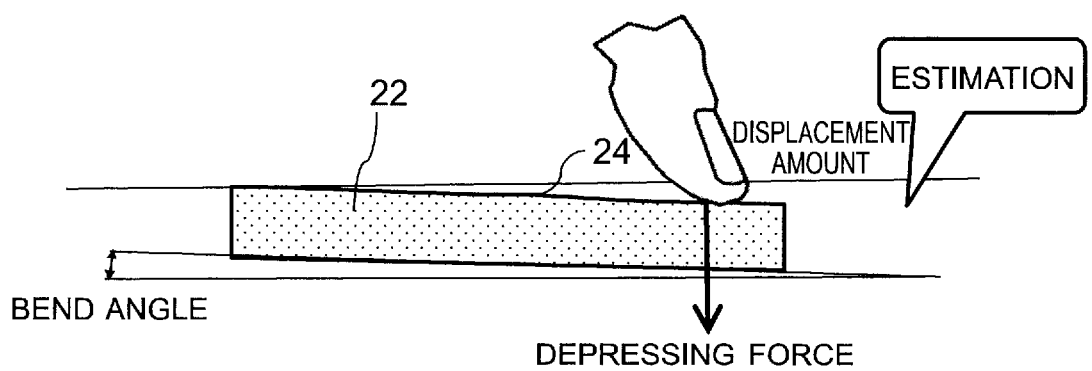
FIG. 23 is a schematic cross-sectional view showing condition of the protective glass when depressing force is applied to the operation surface of the touch panel in the fifth embodiment.

FIG. 22 is a schematic cross-sectional view showing the configuration of the touch panel 23, the elastic member 33 and the depressing force sensors 30_j and 60_j. FIG. 23 is a schematic cross-sectional view showing the shape of the protective glass 22 when depressing force is applied to the operation surface 24 of the touch panel 23. In FIG. 22 and FIG. 23, each component identical or corresponding to a component shown in FIG. 3A is assigned the same reference character as in FIG. 3A.

As shown in FIG. 22, the touch panel device 5 includes the depressing force sensor 60_j having a sensor electrode 61_j provided on a lower surface of the touch sensor 20 to face the GND electrode part 32. The depressing force sensor 60_j is arranged on the inside of the depressing force sensor 30_j. Let Co represent the capacitance of the outside depressing force sensor 30_j and Ci represent the capacitance of the inside depressing force sensor 60_j, the upward warp detection unit 504 is capable of calculating the upward warp amount at the time of bending based on capacitance Co−Ci, for example. Further, the depression detection unit 503 is capable of calculating the depression amount of the elastic member 33 based on (Co+Ci)/2.

As shown in FIG. 23, the bend angle is calculated based on the upward warp amount and the depression amount calculated based on the depressing force sensors 30_j and 60_j, and the displacement amount at the touch position, i.e., a press down amount, is estimated based on the touch position detected by the touch sensor 20 and the bend angle. It is possible to calculate the depressing force based on the estimated displacement amount at the touch position and the rigidity of the touch panel. Incidentally, while two depressing force sensors 30_j and 60_j are shown as a set in FIG. 22, the number and arrangement of depressing force sensors are not limited to those in the example of FIG. 22.

Figure 24:
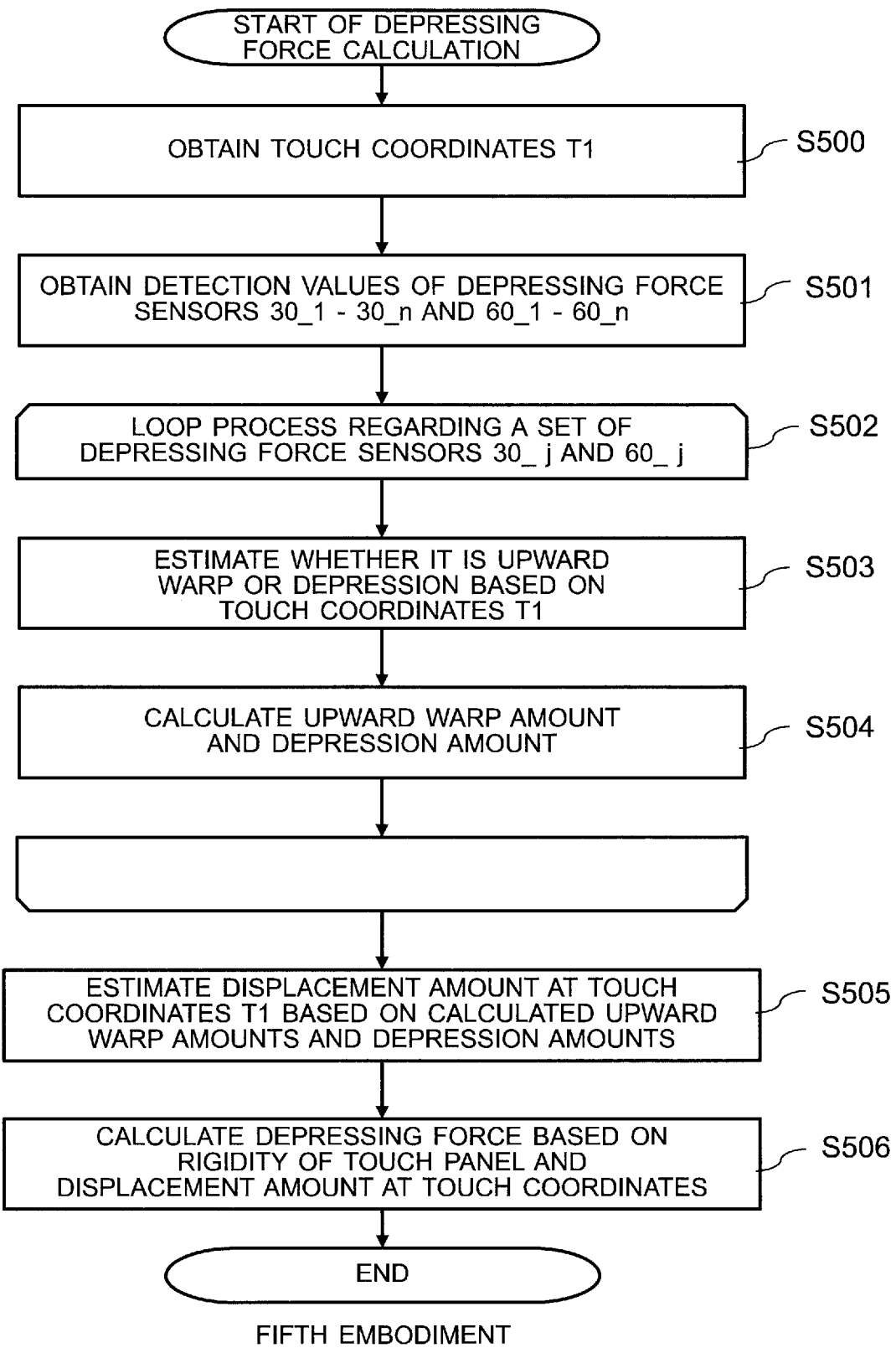
FIG. 24 is a flowchart showing a depressing force calculation process executed by a control device of the touch panel device according to the fifth embodiment.

FIG. 24 is a flowchart showing a depressing force calculation process executed by the control device 500 of the touch panel device 5 according to the fifth embodiment. In step S500, the coordinate detection unit 101 obtains the touch coordinates T1. In step S501, the depressing force detection unit 502 obtains the detection values D1_1-D1_$n$ of all the depressing force sensors 30_1-30_$n$ and detection values D2_1-D2_$n$ of all the depressing force sensors 60_1-60_$n$.

Subsequently, a loop process of steps S502 to S504 is executed. In step S502, the displacement amount estimation unit 506 executes processing of the steps S503 and S504 regarding the capacitance Co of the depressing force sensor 30_j and the capacitance Ci of the depressing force sensor 60_j as a set. In the step S503, based on the touch coordinates T1 obtained in the step S500, it is estimated whether the set of the depressing force sensors 30_j and 60_j has, namely, the depressing force sensors 30_j and 60_j have, the upward warp or the depression. In the step S504, in the depressing force detection unit 502, based on the result of the estimation in the step S503, the upward warp detection unit 504 calculates the upward warp in the case of the upward warp, or the depression detection unit 503 calculates the depression in the case of the depression. In step S505, based on the upward warp amounts and the depression amounts calculated in the step S504, the displacement amount estimation unit 506 calculates the bend angle and estimates the displacement amount at the touch coordinates.

In step S506, the depressing force calculation unit 505 calculates the depressing force based on the displacement amount at the touch coordinates T1 estimated in the step S505 and the rigidity of the touch panel 23.

As described above, by using the touch panel device 5 and the depressing force calculation method according to the fifth embodiment, accurate depressing force can be obtained by arranging the depressing force sensors 60_1-60_$n$ in addition to the depressing force sensors 30_1-30_$n$, obtaining the displacement amount at the touch coordinates T1 based on the bending of the touch panel 23, and calculating the depressing force based on the rigidity of the touch panel 23.

Incidentally, the depressing force sensors 60_1-60_$n$ for detecting the capacitance Ci may also be arranged on the inside of the elastic member 33.

(6) Sixth Embodiment

A touch panel device 6 according to a sixth embodiment switches the depressing force calculation mode depending on condition of the touch panel device 6. The condition of the touch panel device 6 is, for example, whether the touch panel device 6 is a device of a side mount type or a device of a compression mount type.

Figure 25:
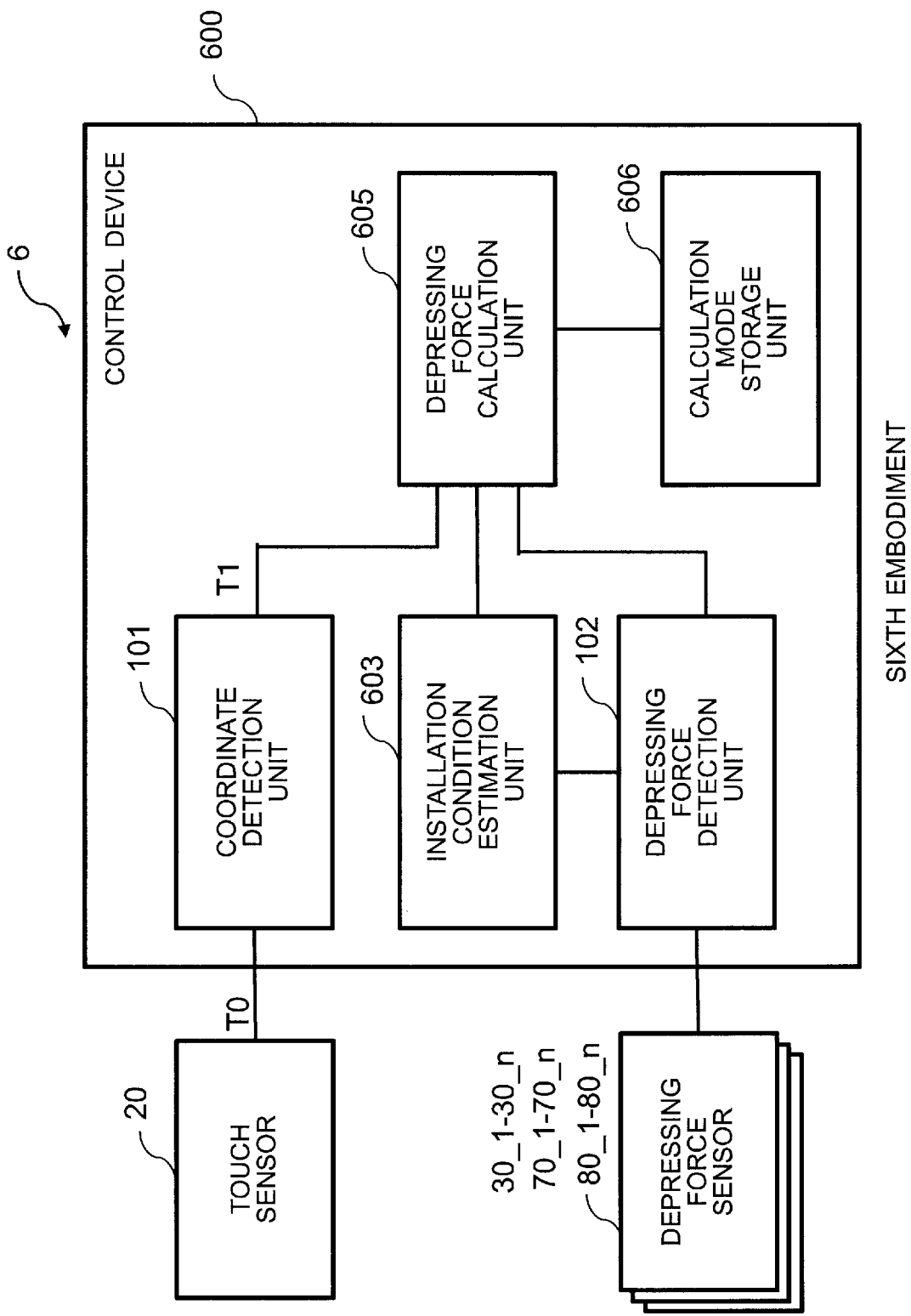
FIG. 25 is a functional block diagram schematically showing the configuration of a touch panel device according to a sixth embodiment of the present disclosure.

FIG. 25 is a functional block diagram schematically showing the configuration of the touch panel device 6 according to the sixth embodiment. In FIG. 25, each component identical or corresponding to a component shown in FIG. 4 is assigned the same reference character as in FIG. 4. As shown in FIG. 25, a control device 600 of the touch panel device 6 includes the coordinate detection unit 101, the depressing force detection unit 102, an installation condition estimation unit 603 that estimates installation condition of the touch panel device 6, a calculation mode storage unit 606 that previously stores depressing force calculation modes, and a depressing force calculation unit 605 that calculates the depressing force. However, the calculation mode storage unit 606 does not necessarily have to be a part of the touch panel device 6. The calculation mode storage unit 606 can also be an external storage device connected to the touch panel device 6 to be capable of communication with the touch panel device 6.

Specifically, the control device 600 includes the coordinate detection unit 101 that obtains the touch coordinates T1 indicating the position of the touch operation, the depressing force detection unit 102 that obtains a plurality of detection values corresponding to the sensor signals when depressing force is applied to the operation surface 24, the installation condition estimation unit 603 that estimates condition of a frame part in which the touch panel 23 has been installed based on the plurality of detection values D1_j, and the depressing force calculation unit 605 that calculates the depressing force by using a depressing force calculation mode based on the condition of the frame part in which the touch panel 23 has been installed estimated by the installation condition estimation unit 603 and the touch coordinates T1.

Figure 26:
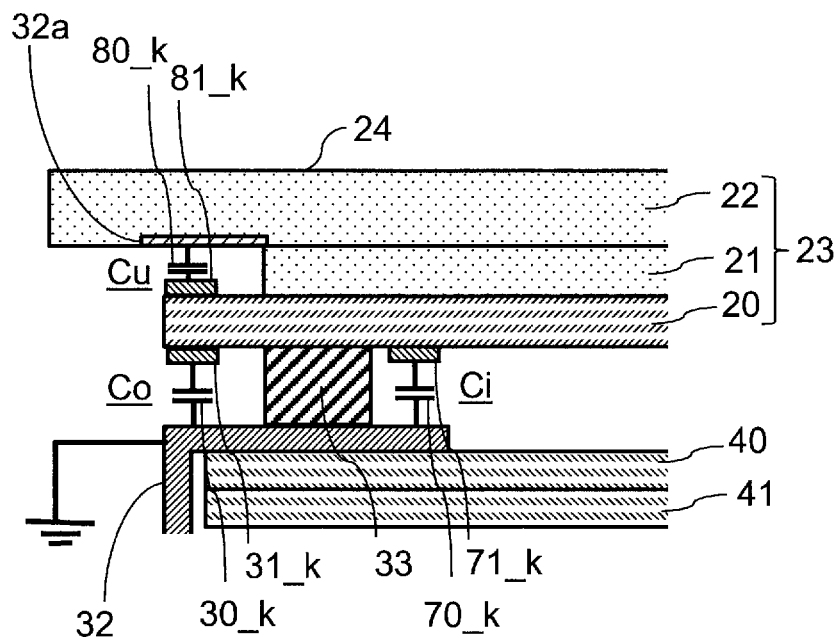
FIG. 26 is a schematic cross-sectional view showing the touch panel device according to the sixth embodiment.

FIG. 26 is a schematic cross-sectional view showing the touch panel device 6 according to the sixth embodiment. FIG. 26 is a schematic cross-sectional view showing an example of the arrangement of depressing force sensors 30_j, 70_j and 80_j in the touch panel device 6. The character j represents an integer greater than or equal to 1 and less than or equal to n. In the touch panel device 6, the depressing force sensors 80_j are arranged on top of the touch sensor 20 while the depressing force sensors 30_j and 70_j are arranged on the underside of the touch sensor 20.

The depressing force sensor 80_j is made up of a GND electrode part 32a provided on the underside of the protective glass 22 and a sensor electrode part 81_j provided on top of the touch sensor 20. The GND electrode part 32a and the sensor electrode part 81_j are arranged to face each other across a distance corresponding to the thickness of the adhesive agent 21. The depressing force sensor 80_j has capacitance Cu at a value corresponding to the distance between the sensor electrode part 81_j and the GND electrode part 32a, the area of the sensor electrode part 81_j and a relative dielectric constant between the electrodes.

The depressing force sensor 30_j is made up of the GND electrode part 32 provided on top of the liquid crystal panel 40 and the sensor electrode part 31_j provided on the underside of the touch sensor 20. The sensor electrode part 31_j is arranged on the outside of the elastic member 33. The GND electrode part 32 and the sensor electrode part 31_j are arranged at a distance that changes depending on the thickness of the elastic member 33 and the upward warp. The depressing force sensor 30_j has the capacitance Co at a value corresponding to the distance between the sensor electrode part 31_j and the GND electrode part 32, the area of the sensor electrode part 31_j and a relative dielectric constant between the electrodes.

The depressing force sensor 70_j is made up of the GND electrode part 32 provided on top of the liquid crystal panel 40 and a sensor electrode part 71_j provided on the underside of the touch sensor 20. The sensor electrode part 71_j is arranged on the inside of the elastic member 33. The GND electrode part 32 and the sensor electrode part 71_j are arranged at a distance that changes depending on the thickness of the elastic member 33 and the depression. The depressing force sensor 70_j has the capacitance Ci at a value corresponding to the distance between the sensor electrode part 71_j and the GND electrode part 32, the area of the sensor electrode part 71_j and a relative dielectric constant between the electrodes.

Figure 27:
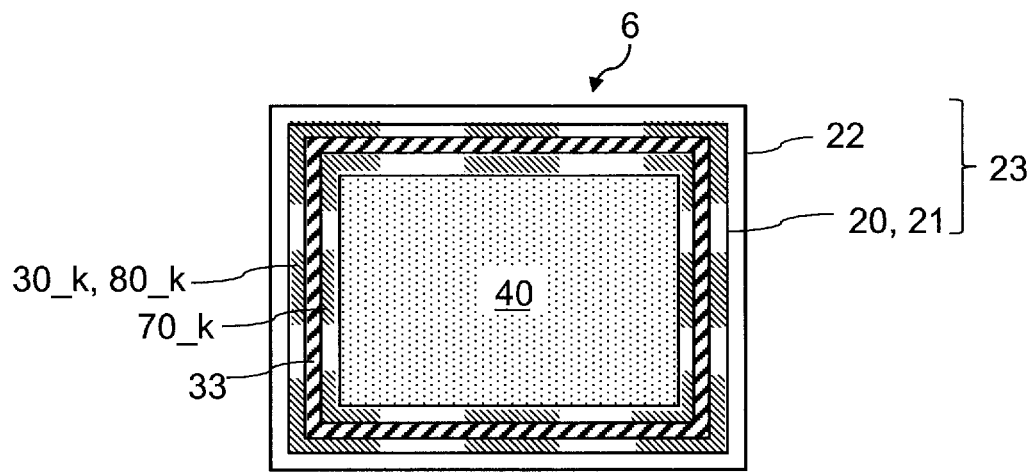
FIG. 27 is a schematic plan view showing the touch panel device according to the sixth embodiment.

FIG. 27 is a schematic plan view showing the touch panel device 6. The elastic member 33 supports the touch panel 23 on the GND electrode part 32. The GND electrode part 32 is arranged to cover the depressing force sensors 30_1-30_n and 70_1-70_n, for example. Suppose that the touch sensor 20 arranged on the liquid crystal panel 40 is covered by the GND electrode part 32, that affects the sensitivity of the touch sensor 20 for detecting touch operations. Therefore, it is desirable to provide the GND electrode part 32 outside the touch sensor 20 and provide the touch sensor 20 in a region not overlapping with the GND electrode part 32.

Further, each depressing force sensor 30_j, 70_j, 80_j is desired to be arranged at a plurality of positions as shown in FIG. 27. The sensor electrode part 31_j, 71_j, 81_j of each depressing force sensor 30_j, 70_j, 80_j may also be provided in the touch sensor 20 similarly to touch position detection electrodes in the touch sensor 20. The sensor electrode parts 31_j, 71_j and 81_j of the depressing force sensors may be formed by, for example, a process for generating a pattern of ITO (Indium Tin Oxide) as transparent electrodes, metallic micro-wiring or the like.

Figure 28:
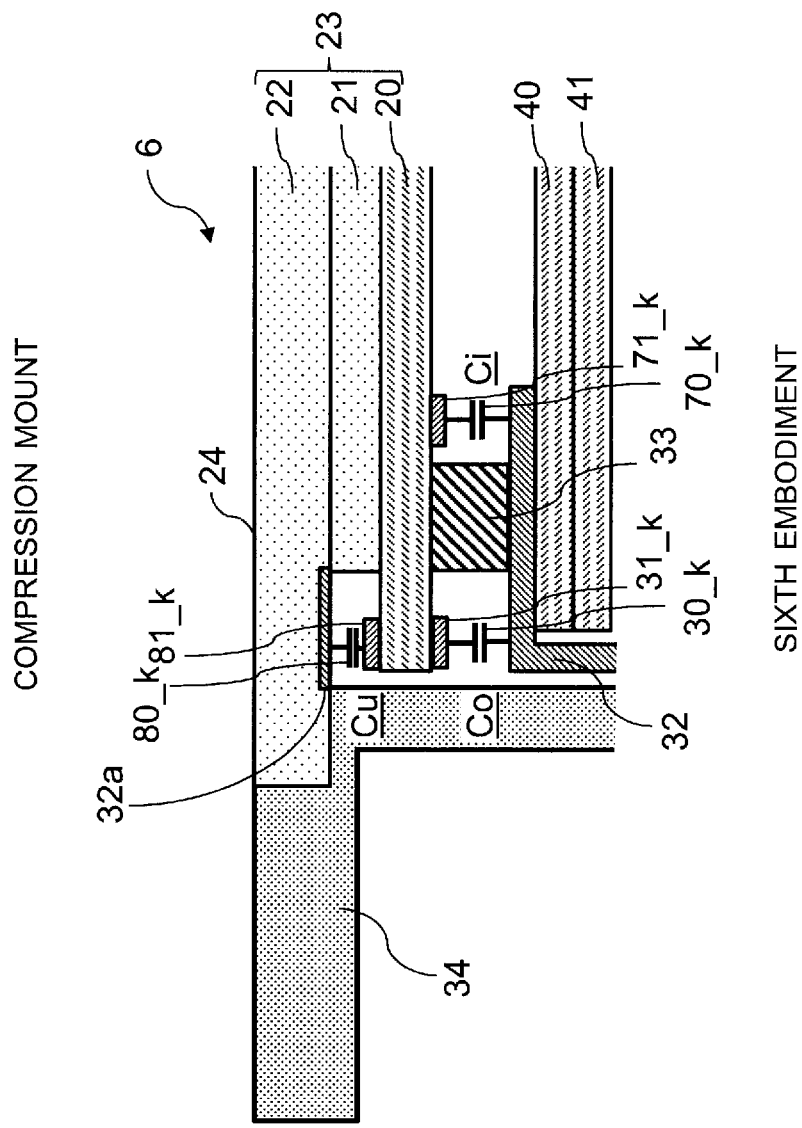
FIG. 28 is a schematic cross-sectional view showing a state in which the touch panel device according to the sixth embodiment has been installed by means of a compression mount.
Figure 29:
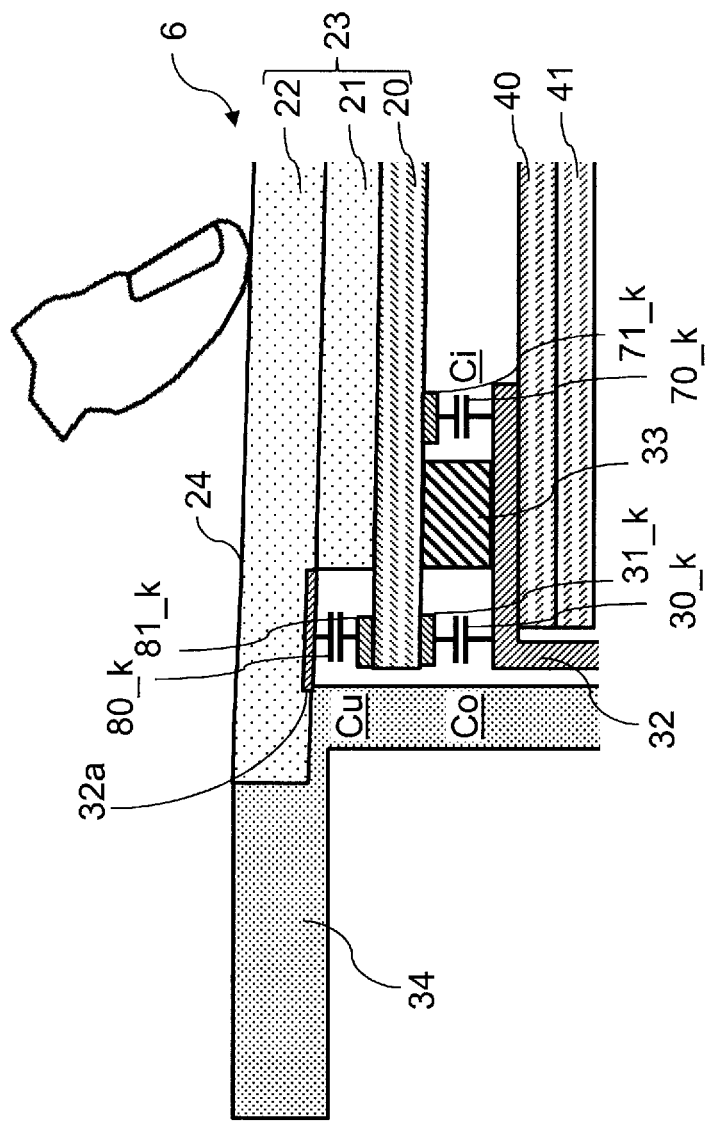
FIG. 29 is a schematic cross-sectional view showing a state when depressing force is applied to the operation surface of the touch panel device of FIG. 28.

FIG. 28 is a schematic cross-sectional view showing a state in which the touch panel device 6 according to the sixth embodiment has been installed by means of the compression mount. FIG. 29 is a schematic cross-sectional view showing a state when depressing force is applied to the operation surface 24 of the touch panel device 6 of FIG. 28. The compression mount is an installation method that is employed for realizing a flat display design. In this case, the touch panel 23 has been installed so that a part of the protective glass 22 extends to the outside of the GND electrode part 32 of the touch panel device and is supported by a support 34 forming the frame part.

When the depressing operation is performed on the operation surface 24 of the touch panel 23, the touch panel 23 and the depressing force sensors 30_j, 70_j and 80_j are deformed as shown in FIG. 29. At that time, the protective glass 22 is supported by the support 34 and a deformation like bending occurs due to the depressing force. Consequently, the protective glass 22 bends widely and the capacitance Cu of the depressing force sensor 80_j changes the most significantly. Since no reaction force from the bottom side of the touch panel 23 is obtained, deformation of members stacked under materials like the adhesive agent 21 and the elastic member 33 having flexibility tends to be slight. Thus, the change in the capacitance Co of the depressing force sensor 30_j and the change in the capacitance Ci of the depressing force sensor 70_j caused by the bending are smaller than the change in the capacitance Cu of the depressing force sensor 80_j caused by the bending. Further, the depression of the elastic member 33 hardly occurs, the elastic member 33 works as a supporting point, and the amount of change in the capacitance (Co+Ci) is extremely small as a result of the upward warp of the depressing force sensor 30_j due to the bending or the depression of the depressing force sensor 70_j due to the bending.

As described above, the installation condition estimation unit 603 judges that the touch panel device 6 has been installed by means of the compression mount if the amount ΔCu, ΔCo, ΔCi of change in the capacitance Cu, Co, Ci due to the depressing of the operation surface 24 satisfies ΔCu>ΔCo and ΔCu>ΔCi.

Figure 30:
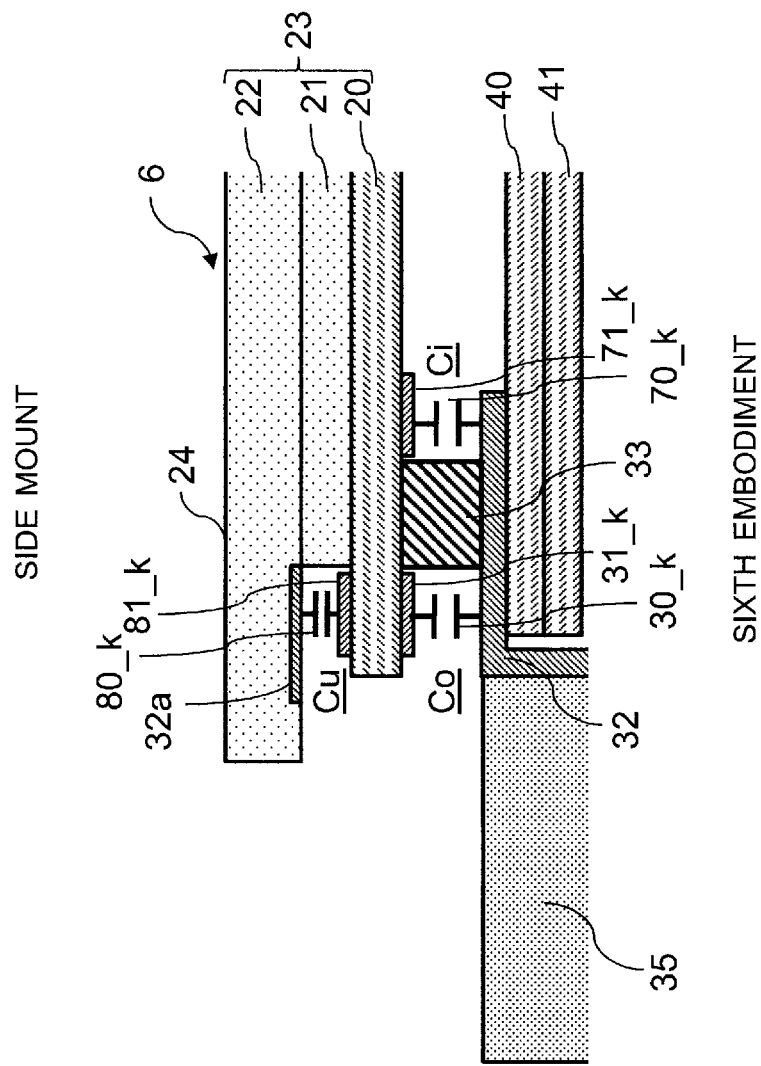
FIG. 30 is a schematic cross-sectional view showing a state in which the touch panel device according to the sixth embodiment has been installed by means of a side mount.

FIG. 30 is a schematic cross-sectional view showing a state in which the touch panel device 6 according to the sixth embodiment has been installed by means of the side mount. FIG. 31 is a schematic cross-sectional view showing a state when depressing force is applied to the operation surface 24 of the touch panel device 6 of FIG. 30. In the side mount, the touch panel device is installed in a form in which side faces of the GND electrode part 32 forming an outer frame of the liquid crystal panel 40 are sandwiched from both sides by the frame part or in a form in which the frame part supports the touch panel 23. When the depressing operation is performed on the operation surface 24 of the touch panel 23, the touch panel 23 and the depressing force sensors 30_j, 70_j and 80_j are deformed as shown in FIG. 31. At that time, the GND electrode part 32 works as a support and reaction force against the pressing occurs. Accordingly, the elastic member 33 is deformed, and on the elastic member 33 as a supporting point, the touch sensor 20 and the protective glass 22 bend at the same time. In this case, the capacitance Cu of the depressing force sensor 80_j hardly changes since no great difference occurs between a bending amount of the touch sensor 20 and a bending amount of the protective glass 22. Namely, $\Delta Cu \approx 0$ holds. On the other hand, since the elastic member 33 is depressed and the touch sensor 20 bends, the capacitance Ci of the depressing force sensor 70_j increases due to the occurrence of both of the depression and the bending.

As described above, the installation condition estimation unit 603 judges that the touch panel device 6 has been installed by means of the side mount if the amount $\Delta Cu$, $\Delta Co$, $\Delta Ci$ of change in the capacitance Cu, Co, Ci due to the depressing of the operation surface 24 satisfies $\Delta Ci > \Delta Cu$ and $\Delta Cu \approx 0$.

The bending is the main factor of the deformation in touch panel devices installed by means of the compression mount, whereas a combination of the bending and the depression appears in the deformation in touch panel devices installed by means of the side mount. Therefore, in a case of the side mount, the depressing force calculation unit 605 can calculate the depressing force by the method of the first embodiment or calculate the depressing force by the method of the fifth embodiment. In contrast, in a case of the compression mount, due to the relationship between the supporting point and the point of action in regard to the bending, for the depressing force calculation unit 605, the depressing force detection value decreases as the position becomes closer to an edge part and increases as the position becomes closer to the central part. Therefore, accurate calculation of the depressing force becomes possible by changing the coefficients $k_1, k_2, \ldots, k_n$ of the expression (1) depending on the touch position.

Incidentally, while an example of arranging the three depressing force sensors 30_j, 70_j and 80_j at a plurality of positions has been described in the sixth embodiment, it is also possible to arrange only depressing force sensors 80_j necessary for the judgment on the compression mount or only depressing force sensors 30_j and 70_j necessary for the judgment on the side mount.

Further, it is also possible to sense the bending by arranging a high-sensitivity depressing force sensor like a strain gauge in a central part of the liquid crystal panel 40 or on a side face of the liquid crystal panel 40. Furthermore, it is also possible to sense the depressing force applied to the elastic member 33 by installing a piezoelectric element or the like under the elastic member 33.

Moreover, it is also possible to arrange depressing force sensors for sensing the bending in a case of the compression mount and depressing force sensors for sensing the deformation of the elastic member 33 in a case of the side mount at positions suitable for the sensing and make the control device 600 switch the depressing force calculation mode based on a result of comparison of sensitivity values.

(7) Modifications

The depressing force calculation mode determination process shown in FIG. 8 and FIG. 9 is applicable also to the second to sixth embodiments.

Further, it is possible to appropriately combine the configurations of the touch panel devices 1 to 6 in the above first to sixth embodiments.

(8) Appendix

The invention described in each of the above embodiments are described as "Appendix".

Appendix 1 (corresponding to original claim 4)
A touch panel device comprising:
a touch panel having an operation surface on which a touch operation is performed;
an elastic member that supports the touch panel;
a plurality of depressing force sensors that output sensor signals corresponding to depressing force applied to the operation surface;
a coordinate detection unit that obtains touch coordinates indicating a position of the touch operation;
a depressing force detection unit that obtains a plurality of detection values corresponding to the sensor signals when depressing force is applied to the operation surface;
a drive pattern determination unit that loads a plurality of drive patterns of the plurality of depressing force sensors from a drive pattern storage unit storing a plurality of regions on the operation surface and the plurality of drive patterns corresponding to the plurality of regions and selects a drive pattern for a region corresponding to the touch coordinates from the plurality of drive patterns;
a sensor drive unit that drives depressing force sensors according to the selected drive pattern among the plurality of depressing force sensors; and
a depressing force calculation unit that calculates the depressing force by using the detection values corresponding to the sensor signals outputted from the depressing force sensors according to the selected drive pattern.

Appendix 2 (corresponding to original claim 5)
The touch panel device according to appendix 1, wherein the sensor drive unit parallelly drives depressing force sensors at positions where depression occurs due to the application of the depressing force or parallelly drives depressing force sensors at positions where an upward warp occurs due to the application of the depressing force as the depressing force sensors according to the selected drive pattern.

Appendix 3 (corresponding to original claim 6)
The touch panel device according to appendix 1 or 2, wherein the sensor drive unit drives a depressing force sensor at a position where depression occurs due to the application of the depressing force and a depressing force sensor at a position where an upward warp occurs due to the application of the depressing force as the depressing force sensors according to the selected drive pattern.

Appendix 4 (corresponding to original claim 7)
A touch panel device comprising:
a touch panel having an operation surface on which a touch operation is performed;
an elastic member that supports the touch panel;
a plurality of depressing force sensors that output sensor signals corresponding to depressing force applied to the operation surface;
a coordinate detection unit that obtains touch coordinates indicating a position of the touch operation;
a depressing force detection unit that obtains a plurality of detection values corresponding to the sensor signals when depressing force is applied to the operation surface;

a multi-touch judgment unit that judges whether the touch operation is a single touch operation or a multi-touch operation; and a depressing force calculation unit that selects a depressing force calculation mode from a depressing force calculation mode for a case where the single touch operation is performed and a depressing force calculation mode for a case where the multi-touch operation is performed, stored in a calculation mode storage unit, based on the touch operation and calculates the depressing force by using the selected depressing force calculation mode and the plurality of detection values.

Appendix 5 (corresponding to original claim 8)

The touch panel device according to appendix 4, wherein the depressing force calculation unit uses a calculation mode based on a sensor value of a depressing force sensor at a position where an upward warp occurs to the touch panel and a sensor value of a depressing force sensor at a position where depression occurs to the touch panel as the depressing force calculation mode for a case where the single touch operation is performed.

Appendix 6 (corresponding to original claim 9)

The touch panel device according to appendix 4 or 5, wherein the depressing force calculation unit uses a calculation mode based on a sum of absolute values of amounts of change in the detection values of the depressing force sensors from the detection values outputted from the depressing force detection unit when there is no touch operation or in a state of an immediately previous touch operation as the depressing force calculation mode for a case where the multi-touch operation is performed.

Appendix 7 (corresponding to original claim 10)

The touch panel device according to appendix 4, further comprising a priority determination unit that determines priority of each depressing force calculation mode stored in the calculation mode storage unit based on a distance between the touch coordinates and the depressing force sensor when the multi-touch operation is performed, wherein the depressing force calculation unit determines the depressing force calculation mode by using the priority.

Appendix 8 (corresponding to original claim 11)

A touch panel device comprising:

a touch panel having an operation surface on which a touch operation is performed;

an elastic member that supports the touch panel;

a plurality of depressing force sensors that output sensor signals corresponding to depressing force applied to the operation surface;

a coordinate detection unit that obtains touch coordinates indicating a position of the touch operation;

a depressing force detection unit that obtains a plurality of detection values corresponding to the sensor signals when depressing force is applied to the operation surface;

a displacement amount estimation unit that calculates a bend angle of the touch panel based on the plurality of detection values and calculates a displacement amount of the touch panel based on the bend angle and the touch coordinates; and a depressing force calculation unit that calculates the depressing force based on the displacement amount and rigidity of the touch panel.

Appendix 9 (corresponding to original claim 12)

The touch panel device according to appendix 8, wherein the plurality of depressing force sensors include a depressing force sensor that detects an upward warp or depression of the touch panel at a position outside the elastic member.

Appendix 10 (corresponding to original claim 13)

The touch panel device according to claim 8 or 9, wherein the plurality of depressing force sensors include a depressing force sensor that detects depression of the touch panel at a position inside the elastic member.

Appendix 11 (corresponding to original claim 14)

A touch panel device comprising:

a touch panel having an operation surface on which a touch operation is performed;

an elastic member that supports the touch panel;

a plurality of depressing force sensors that output sensor signals corresponding to depressing force applied to the operation surface;

a coordinate detection unit that obtains touch coordinates indicating a position of the touch operation;

a depressing force detection unit that obtains a plurality of detection values corresponding to the sensor signals when depressing force is applied to the operation surface;

an installation condition estimation unit that estimates condition of a frame part in which the touch panel has been installed based on the plurality of detection values; and a depressing force calculation unit that calculates the depressing force by using a depressing force calculation mode based on the condition of the frame part in which the touch panel has been installed estimated by the installation condition estimation unit and the touch coordinates.

Appendix 12 (corresponding to original claim 15)

The touch panel device according to claim 11, wherein the plurality of depressing force sensors include:

a depressing force sensor that detects an upward warp or depression of the touch panel at a position outside the elastic member; and a depressing force sensor that detects the depression of the touch panel at a position inside the elastic member.

Appendix 13 (corresponding to original claim 16)

The touch panel device according to claim 11 or 12, wherein the plurality of depressing force sensors include a depressing force sensor that detects a distance between a protective glass forming a front surface of the touch panel and a touch sensor stuck on the protective glass via an adhesive agent.

DESCRIPTION OF REFERENCE CHARACTERS 1, 2, 3, 4, 4a, 5, 6: touch panel device, 20: touch sensor, 21: adhesive agent, 22: protective glass, 23: touch panel, 24: operation surface, 30_1-30_n, 30_j: depressing force sensor, 32, 32a: GND electrode part, 33: elastic member, 40: liquid crystal panel, 41: substrate, 51: processor, 52: memory, 60_1-60_n, 60_j: depressing force sensor, 70_i-70_n, 70_j: depressing force sensor, 80_1-80_n, 80_j: depressing force sensor, 100, 200, 300, 400, 400a, 500, 600: control device, 101: coordinate detection unit, 102: depressing force detection unit, 103: calculation mode generation unit, 104: calculation mode storage unit, 105: depressing force calculation unit, 201, 301: drive pattern storage unit, 202, 302: drive pattern determination unit, 203, 303: sensor drive unit, 205, 305, 405a, 505, 605: depressing force calculation unit, 404: multi-touch judgment unit, 406, 606: calculation mode storage unit, 407: priority determination unit, 502: depressing force detection unit, 506: displacement amount estimation unit, 603: installation condition estimation unit.

What is claimed is:

1. A touch panel device comprising:
a touch panel having an operation surface on which a touch operation is performed;
an elastic member that supports the touch panel;
a plurality of depressing force sensors arranged at installation positions outside the elastic member and outputting sensor signals corresponding to magnitude of depressing force and a position on the operation surface to which the depressing force is applied, wherein the installation positions are positions where depression of the touch panel occurs due to the application of the depressing force or where upward warps of the touch panel occur due to the application of the depressing force, depending on the magnitude of the depressing force and the position on the operation surface to which the depressing force is applied; and
processing circuitry
to obtain touch coordinates indicating a position of the touch operation;
to obtain a plurality of detection values corresponding to the sensor signals when the depressing force is applied to the operation surface; and
to load a plurality of predetermined depressing force calculation modes from a storage storing a plurality of regions on the operation surface and the plurality of predetermined depressing force calculation modes corresponding to the plurality of regions, to select a depressing force calculation mode for a region corresponding to the touch coordinates from the plurality of depressing force calculation modes, and to calculate the depressing force by using the selected depressing force calculation mode and the plurality of detection values.

2. The touch panel device according to claim 1, wherein the processing circuitry previously generates the plurality of regions on the operation surface and the plurality of depressing force calculation modes corresponding to the plurality of regions and stores the generated regions and depressing force calculation modes in the storage.

3. The touch panel device according to claim 1, wherein each of the plurality of depressing force calculation modes is a calculation formula for calculating the depressing force by weighted addition of the plurality of detection values.

4. A depressing force calculation method to be executed by a touch panel device that includes a touch panel having an operation surface on which a touch operation is performed, an elastic member that supports the touch panel, and a plurality of depressing force sensors arranged at installation positions outside the elastic member and outputting sensor signals corresponding to magnitude of depressing force and a position on the operation surface to which the depressing force is applied, wherein the installation positions are positions where depression of the touch panel occurs due to the application of the depressing force or where upward warps of the touch panel occur due to the application of the depressing force, depending on the magnitude of the depressing force and the position on the operation surface to which the depressing force is applied, the method comprising:
obtaining touch coordinates indicating a position of the touch operation;
obtaining a plurality of detection values corresponding to the sensor signals when the depressing force is applied to the operation surface; and
loading a plurality of predetermined depressing force calculation modes from a storage storing a plurality of regions on the operation surface and the plurality of predetermined depressing force calculation modes corresponding to the plurality of regions, selecting a depressing force calculation mode for a region corresponding to the touch coordinates from the plurality of depressing force calculation modes, and calculating the depressing force by using the selected depressing force calculation mode and the plurality of detection values.

5. A non-transitory computer-readable storage medium storing a depressing force calculation program to be executed by a control device of a touch panel device that includes a touch panel having an operation surface on which a touch operation is performed, an elastic member that supports the touch panel, and a plurality of depressing force sensors arranged at installation positions outside the elastic member and outputting sensor signals corresponding to magnitude of depressing force and a position on the operation surface to which the depressing force is applied, wherein the installation positions are positions where depression of the touch panel occurs due to the application of the depressing force or where upward warps of the touch panel occur due to the application of the depressing force, depending on the magnitude of the depressing force and the position on the operation surface to which the depressing force is applied,
the depressing force calculation program causing the control device to execute:
obtaining touch coordinates indicating a position of the touch operation;
obtaining a plurality of detection values corresponding to the sensor signals when depressing force is applied to the operation surface; and
loading a plurality of predetermined depressing force calculation modes from a storage storing a plurality of regions on the operation surface and the plurality of predetermined depressing force calculation modes corresponding to the plurality of regions, selecting a depressing force calculation mode for a region corresponding to the touch coordinates from the plurality of depressing force calculation modes, and calculating the depressing force by using the selected depressing force calculation mode and the plurality of detection values.

* * * * *